United States Patent
Broyde et al.

(10) Patent No.: US 8,461,937 B2
(45) Date of Patent: Jun. 11, 2013

(54) METHOD FOR PSEUDO-DIFFERENTIAL TRANSMISSION USING NATURAL ELECTRICAL VARIABLES

(75) Inventors: Frederic Broyde, Maule (FR); Evelyne Clavelier, Maule (FR)

(73) Assignee: Excem, Maule (FR)

(*) Notice: Subject to any disclaimer, the term of this patent is extended or adjusted under 35 U.S.C. 154(b) by 223 days.

(21) Appl. No.: 13/017,675

(22) Filed: Jan. 31, 2011

(65) Prior Publication Data

US 2011/0121914 A1    May 26, 2011

Related U.S. Application Data

(63) Continuation of application No. PCT/IB2009/052645, filed on Jun. 19, 2009.

(30) Foreign Application Priority Data

Aug. 4, 2008 (FR) ...................................... 08 04430

(51) Int. Cl.
*H01P 5/12* (2006.01)
*H03H 7/38* (2006.01)

(52) U.S. Cl.
USPC .................................. 333/1; 333/33; 333/125

(58) Field of Classification Search
USPC .................................. 333/1, 12, 33, 24 R, 125
See application file for complete search history.

(56) References Cited

U.S. PATENT DOCUMENTS 5,638,322 A    6/1997   Lacey
5,805,030 A *  9/1998   Dhuey et al. ...................... 333/1

(Continued)

FOREIGN PATENT DOCUMENTS

FR    2 852 467    9/2004
WO    2004/062129  7/2004

(Continued)

OTHER PUBLICATIONS

Broyde et al., "A New Method for the Reduction of Crosstalk and Echo in Multiconductor Interconnections," IEEE Transactions on Circuits and Systems vol. 52, No. 2, (Feb. 2005), pp. 405-416.

(Continued)

*Primary Examiner* — Dean O Takaoka
*Assistant Examiner* — Alan Wong
(74) *Attorney, Agent, or Firm* — Barnes & Thornburg LLP

(57) ABSTRACT

The invention relates to a method and a device for pseudo-differential transmission in interconnections used for sending a plurality of electrical signals.

The ends of an interconnection having 4 transmission conductors and a return conductor distinct from the reference conductor are each connected to a termination circuit. Three damping circuits are connected between the return conductor and the reference conductor. The transmitting circuits receive at their inputs the signals from the 4 channels of the two sources, and are connected to the conductors of the interconnection. A transmitting circuit in the activated state produces natural electrical variables, each natural electrical variable being allocated to one and only one channel. The receiving circuits are connected to the conductors of the interconnection, each receiving circuit being such that the 4 channels of a source connected to a transmitting circuit in the activated state are sent to the four channels of the destinations without noticeable echo, internal crosstalk and external crosstalk.

13 Claims, 12 Drawing Sheets

U.S. PATENT DOCUMENTS

| | | | |
|---|---|---|---|
| 5,818,261 A | 10/1998 | Perner | |
| 5,994,925 A | 11/1999 | Sessions | |
| 6,195,395 B1 | 2/2001 | Frodsham | |
| 7,080,186 B2 | 7/2006 | Simon et al. | |
| 7,408,426 B2* | 8/2008 | Broyde et al. | 333/100 |
| 8,049,576 B2* | 11/2011 | Broyde et al. | 333/125 |
| 8,248,177 B2* | 8/2012 | Broyde et al. | 333/1 |
| 2006/0267633 A1 | 11/2006 | King | |

FOREIGN PATENT DOCUMENTS

| | | |
|---|---|---|
| WO | 2004/079941 | 9/2004 |
| WO | 2004/082168 | 9/2004 |
| WO | 2008/155676 | 12/2004 |
| WO | 2007/083191 | 7/2007 |
| WO | 2009/007864 | 1/2009 |
| WO | 2009/013644 | 1/2009 |
| WO | 2010/004444 | 1/2010 |

OTHER PUBLICATIONS

Broyde et al., "Correction to a New Method for the Reduction of Crosstalk and Echo in Multiconductor Interconnection", IEEE Transactions on Circuits and Systems, vol. 53, No. 8, (Aug. 2006).

Johnson, et al., "High-Speed Digital Design a Handbook of Black Magic," Prentice-Hall, Inc., (1993), pp. 294-300.

Broyde et al., "A New Pseudo-Differential Transmission Scheme for On-Chip and On-Board Interconnections", Proceeding of the CEM 08 International Symposium on Electromagentic Compatibility, (May 2008).

Broyde et al., "Modeling the Interconnection of a Pseudo-Differential Link Using a Wide Return Conductor", IEEE, (2009).

International Search Report for International Application No. PCT/IB2009/052645, dated Oct. 19, 2009.

* cited by examiner

METHOD FOR PSEUDO-DIFFERENTIAL TRANSMISSION USING NATURAL ELECTRICAL VARIABLES

CROSS REFERENCE TO RELATED APPLICATIONS

This is a Continuation Application of PCT application PCT/IB2009/052645, filed 19 Jun. 2009, published in English under No. WO 2010/015948, which in turn claims priority to French patent application Ser. No. 08/04430 of 4 Aug. 2008, entitled "Procédé de transmission pseudo-différentiel utilisant des variables électriques naturelles", both of which are incorporated herein by reference.

FIELD OF THE INVENTION

The invention relates to a method and a device for pseudo-differential transmission through interconnections used for sending a plurality of electrical signals, such as the interconnections made with multiconductor cables, or with the traces of a printed circuit board, or inside an integrated circuit.

PRIOR ART

Let us consider the problem of transmission through an interconnection, for obtaining m transmission channels, m being an integer greater than or equal to 2. Each transmission channel may be used for transmitting signals of any type, for instance analog signals or digital signals, from a source to a destination. We consider here that a digital signal is a signal whose value is defined only at discrete points in time, the set of the values that the signal may take on being discrete. We consider also that each value of a digital signal corresponds to a voltage or current interval. This definition of a digital signal as a "digital signal defined by voltage or current intervals" includes:

the binary signals used in binary signaling, that is to say any signal such that, in each transmission channel, the set of the values that this signal may take on has 2 elements;

the N-ary signals (N being an integer greater than or equal to 3) used in multilevel signaling, that is to say any signal such that, in each transmission channel, the set of the values that this signal may take on has N elements.

Binary signals are the signals which are the most frequently used today by digital integrated circuits. Multilevel signals, for instance quaternary signals (sometimes referred to as PAM-4 or 4-PAM), are used to obtain high bit rates. We will consider that any signal which does not comply with this definition of a digital signal is an analog signal. Thus, the result of any type of modulation of a carrier by a digital signal will be regarded as an analog signal.

Said transmission may be obtained through an interconnection comprising m+1 conductors, among which m transmission conductors. A device for transmission in such an interconnection is shown in FIG. 1, this device comprising an interconnection (1) having m=4 transmission conductors (11) (12) (13) (14) and a reference conductor (7), that is to say a ground conductor. In FIG. 1, each end of the interconnection is connected to a termination circuit (4). The transmitting circuit (5) receives at its input the signals of the 4 channels of the source (2), and its 5 output terminals are connected to the conductors of the interconnection (1), one of these conductors being ground. The receiving circuit (6) has its 5 input terminals connected to the conductors of the interconnection (1), one of these conductors being ground. The device shown in FIG. 1 provides 4 transmission channels, such that the signals of the 4 channels of the source (2) are sent to the 4 channels of the destination (3). The device shown in FIG. 1 is somewhat general. For instance, according to the case, one and/or the other termination could comprise no component. For instance, according to the case, the transmitting circuit (5) and/or the receiving circuit (6) could comprise no component. However, devices differing from the one shown in FIG. 1 are also conceivable, for instance devices for transmission comprising several sources and/or several destinations, based on a data bus architecture.

The simplest transmission method for obtaining m transmission channels uses m single-ended links. Using m single-ended links, each transmission channel uses one transmission conductor of the interconnection, and the reference conductor (ground) is used for the return current produced by the currents flowing in the m transmission conductors. This scheme may be implemented according to FIG. 1. This method is subject to two detrimental phenomena: echo and crosstalk.

The prior art concerning transmission without echo and without crosstalk, applicable to this patent application, is set out in the 3 following patents:

the French patent number 0300064 of 6 Jan. 2003 entitled "Procédé et dispositif pour la transmission avec une faible diaphonie", corresponding to the international application number PCT/EP2003/015036 of 24 Dec. 2003 (WO 2004/062129), entitled "Method and device for transmission with reduced crosstalk";

the French patent number 0302814 of 6 Mar. 2003 entitled "Procédé et dispositif numériques pour la transmission avec une faible diaphonie", corresponding to the international application number PCT/EP2004/002382 of 18 Feb. 2004 (WO 2004/079941), entitled "Digital method and device for transmission with reduced crosstalk";

the French patent number 0303087 of 13 Mar. 2003 entitled "Procédé et dispositif pour la transmission sans diaphonie", corresponding to the international application number PCT/EP2004/002383 of 18 Feb. 2004 (WO 2004/082168), entitled "Method and device for transmission without crosstalk".

The inventions described in these three patents may be implemented according to FIG. 1. The article of F. Broydé and E. Clavelier entitled "A New Method for the Reduction of Crosstalk and Echo in Multiconductor Interconnections", published in the journal *IEEE Transactions on Circuits and Systems I*, vol. 52, No. 2, pages 405 to 416, in February 2005, corrected and supplemented by the article of F. Broydé and E. Clavelier entitled "Corrections to <<A New Method for the Reduction of Crosstalk and Echo in Multiconductor Interconnections>>", published in the journal *IEEE Transactions on Circuits and Systems I*, vol. 53, No. 8, p. 1851 in August 2006, proves that the inventions described in said French patents number 0300064, number 0302814 and number 0303087 and the corresponding international applications are indeed suitable for removing crosstalk between the different transmission channels obtained with said interconnection, and also for removing echo.

However, there are other crosstalk phenomena which may produce noise. Such phenomena are produced by some electromagnetic couplings between some conductors of said interconnection and other nearby conductors, for instance when said interconnection and these other conductors are built on the same printed circuit board. Such an "other nearby conductor" may for instance be a power supply conductor, a conductor of a link for digital signals, etc. We shall refer to these phenomena as "external crosstalk", for distinguishing them from crosstalk between said transmission channels, which shall be referred to as "internal crosstalk".

As explained in the prior art section of the French patent application Ser. No. 07/05260 of 20 Jul. 2007 entitled "Procédé et dispositif pour les transmissions pseudo-différentielles", corresponding to the international application number PCT/IB2008/052102 of 29 May 2008 (WO 2009/013644), entitled "Method and device for pseudo-differential transmission", a transmission scheme using the reference conductor, which is often called the ground conductor, as a return path for the return current produced by the currents flowing in the transmission conductors, often suffers from a strong coupling between said transmission channels and some loops including a path in the reference conductor. This particular case of external crosstalk is sometimes called "ground noise" or "ground bounce".

If the interconnection is used for building m single-ended links, the reference conductor (ground) is used for the return current produced by the currents flowing in the m transmission conductors, as in the case shown in FIG. 1. This scheme is consequently vulnerable to external crosstalk (it is also subject to internal crosstalk). If the single-ended links are used for sending signals which contain frequencies for which propagation phenomena in the interconnection are not negligible (for instance frequencies higher than the lowest propagation velocity in the interconnection divided by typically 15 times the length of the interconnection), it becomes necessary to use at least one termination circuit (4), as shown in FIG. 1, to reduce reflections. Such a termination circuit (4) may for instance correspond to the schematic diagram shown in FIG. 2, in the case of m=4 single-ended links. The termination circuit (4) shown in FIG. 2 comprises m signal terminals (101), a reference terminal (ground) and m resistors (401) (402) (403) (404), each of said resistors being connected between ground and one and only one of said signal terminals (101). Each signal terminal (101) is intended to be connected to a transmission conductor of the interconnection, and the termination circuit (4) shown in FIG. 2 is characterized, for the interconnection, by an impedance matrix with respect to ground, said impedance matrix with respect to ground being a diagonal matrix of size m×m.

Let us note that the ground symbol used in FIG. 2 (and also in FIG. 3) has exactly the same meaning as the other ground symbol used in some of the other accompanying drawings (FIGS. 1, 6 to 8 and 11 to 15).

Section III of said paper entitled "A New Method for the Reduction of Crosstalk and Echo in Multiconductor Interconnections" explains that a termination circuit (4) such as the one shown in FIG. 2 cannot be matched, unless the transmission conductors are far apart and are hence uncoupled. It also explains that the detrimental effects of reflections may be minimized, if the values of the resistors (401) (402) (403) (404) shown in FIG. 2 are pseudo-matched impedances minimizing a matrix norm of the matrix $P_G$ of the voltage reflection coefficients, with respect to the reference conductor, of the termination circuit (4). This provides a reduction of echo and, to a limited extent, a reduction of internal crosstalk. Unfortunately, the termination circuit (4) shown in FIG. 2 produces return currents flowing mainly in the reference conductor, a characteristic which conflicts with the reduction of external crosstalk.

If the interconnection is used according to one of the inventions described in said French patents number 0300064, number 0302814 and number 0303087 and the corresponding international applications, the reference conductor (ground) is also used for the return current produced by the currents flowing in the m transmission conductors, as shown in FIG. 1. These inventions, which are suitable for reducing or eliminating internal crosstalk, are therefore prone to external crosstalk. A termination circuit (4) used in these inventions must be matched to the (m+1)-conductor multiconductor transmission line used to model the interconnection. That is to say: the impedance matrix, with respect to ground, of the termination circuit must approximate the characteristic impedance matrix $Z_{GC}$, with respect to ground, of said (m+1)-conductor multiconductor transmission line ($Z_{GC}$ is a matrix of size m×m). Such a termination circuit (4) may for instance correspond to the schematic diagram shown in FIG. 3. The termination circuit (4) shown in FIG. 3 comprises m signal terminals (101), a reference terminal (ground), m grounded resistors (401) (402) (403) (404) used as in FIG. 2 and non-grounded resistors (4012) (4013) (4014) (4023) (4024) (4034), each of the non-grounded resistors being connected between two signal terminals. Each signal terminal (101) is intended to be connected to a transmission conductor of the interconnection. The termination circuit (4) shown in FIG. 3 is characterized, for the interconnection, by an impedance matrix with respect to ground, said impedance matrix with respect to ground being a non-diagonal matrix of size m×m. The grounded resistors and the non-grounded resistors are proportioned such that the impedance matrix with respect to ground of the termination circuit (4) approximates said characteristic impedance matrix with respect to ground. Said paper entitled "A New Method for the Reduction of Crosstalk and Echo in Multiconductor Interconnections" shows that such a termination can be used to obtain a cancellation of echo and internal crosstalk. Unfortunately, the termination circuit (4) shown in FIG. 3 produces return currents flowing mainly in the reference conductor, a characteristic which conflicts with the reduction of external crosstalk.

In the case where the destination (3), the termination circuit (4) and the receiving circuit (6) shown in FIG. 1 are built inside an integrated circuit and where the interconnection (1) is built in a printed circuit board to which said integrated circuit is soldered, the French patent No. 08/03876 of 8 Jul. 2008 entitled "Dispositif d'interface multicanal avec circuit de terminaison", corresponding to the international application number PCT/IB2009/051182 of 20 Mar. 2009, entitled "Multichannel interfacing device having a termination circuit", describes the use of the termination circuit shown in FIG. 4. The termination circuit (4) shown in FIG. 4 comprises m signal terminals (101), a common terminal (100), m resistors (405) (406) (407) (408) each connected between the common terminal (100) and one and only one of said signal terminals (101), and resistors (4012) (4013) (4014) (4023) (4024) (4034) each connected between two signal terminals as in FIG. 3. The common terminal nodes of the receiving circuit (6) and the termination circuit (4) are not grounded inside said integrated circuit. The signal terminals (101) of the termination circuit (4) are intended to be connected to the transmission conductors (11) (12) (13) (14) of the interconnection (1) and the common terminal (100) of the termination circuit (4) is intended to be connected to said reference conductor (7) of the interconnection (1). The termination circuit (4) shown in FIG. 4 may replace a termination circuit used in one of the devices described in said French patents number 0300064, number 0302814 and number 0303087 and the corresponding international applications, this termination circuit providing a reduction of the external crosstalk caused by the variable power supply currents flowing in the power supply pins of the integrated circuit which are connected to the reference conductor. Unfortunately, this use of the termination circuit (4) shown in FIG. 4 provides no reduction of the external crosstalk caused by other mechanisms, for instance the external crosstalk caused by coupling with other interconnections or integrated circuits.

However, there are transmission methods intended to provide a good protection against all causes of external crosstalk: differential links (see for instance the book of H. W. Johnson and M. Graham entitled *High-speed digital design: a handbook of black magic*, published by Prentice Hall PTR in 1993), and pseudo-differential links (see for instance the section II of the paper of A. Carusone, K. Farzan and D. A. Johns entitled "Differential signaling with a reduced number of signal paths" published in *IEEE Transactions on Circuits and Systems II*, vol. 48, No. 3, pp. 294-300 in March 2001 and the section 4.2.3 of the book of F. Yuan entitled *CMOS current-mode circuits for data communications*, published by Springer in 2007).

A differential device for transmission providing m transmission channels uses an interconnection having n=2m transmission conductors. A pseudo-differential device for transmission providing m transmission channels uses an interconnection having n=m transmission conductors and a common conductor distinct from the reference conductor (ground). The common conductor is referred to as "return conductor" in the case of the pseudo-differential transmission scheme disclosed in said French patent application Ser. No. 07/05260 and the corresponding international application.

It should be noted that the wording "pseudo-differential" is also applied to devices which are not related in any way to pseudo-differential transmission. For instance, the patent application of the United States of America number US 2006/0267633 entitled "Pseudo-differential output driver with high immunity to noise and jitter" relates to a device having one differential input channel and one single-ended output channel: this device is not related to pseudo-differential transmission in any way. For instance, the U.S. Pat. No. 5,638,322 of the United States of America entitled "Apparatus and method for improving common mode noise rejection in pseudo-differential sense amplifiers" relates to sense amplifiers which to some extent look like conventional differential amplifiers: this invention is not related to pseudo-differential transmission in any way.

We note that the invention described in said French patent No. 08/03876 and the corresponding international application is not compatible with any known pseudo-differential transmission scheme, since there is no known pseudo-differential transmission scheme which can use a termination circuit approximately equivalent to a (m+1)-terminal network such that the impedance matrix with respect to said common terminal of said (m+1)-terminal network is equal to a wanted non-diagonal matrix of size m×m.

A pseudo-differential device for transmission providing m=4 transmission channels is shown in FIG. 6, this device comprising an interconnection (1) having n=4 transmission conductors (11) (12) (13) (14) plus a common conductor (10) distinct from the reference conductor (7).

In FIG. 6, the transmitting circuit (5) receives at its input the signals of the 4 channels of the source (2), and its 5 output terminals are connected to the n+1=5 conductors of the interconnection (1), one of these conductors being the common conductor (10). The receiving circuit (6) has its 5 input terminals connected to the n+1 conductors of the interconnection (1), one of these conductors being the common conductor (10). The receiving circuit (6) produces voltages at its output terminals connected to the destination (3), each of these voltages being determined by one and only one of the voltages between one of the transmission conductors and the common conductor. The device shown in FIG. 6 provides 4 transmission channels, such that the signals of the 4 channels of the source (2) are sent to the 4 channels of the destination (3).

In FIG. 6, there is no termination circuit, as is the case in the patent of the U.S. Pat. No. 5,818,261 entitled "Pseudo-differential bus driver/receiver for field programmable devices", in the patent of the U.S. Pat. No. 5,994,925 entitled "Pseudo-differential logic receiver" and in the patent of the U.S. Pat. No. 7,099,395 entitled "Reducing coupled noise in pseudo-differential signaling". Consequently, in the case of FIG. 6, substantial reflections of signals occur, and the specialists know that this implies limitations on the length L of the interconnection (L must be sufficiently small) and on the available bandwidth.

In FIG. 6, since no termination is present, there is no constraint on the manner of routing the interconnection (1) with respect to ground (7). Consequently, in FIG. 6, the reference conductor (7) is represented as an irregular geometrical shape, such that the distance between the conductors of the interconnection (1) and the reference conductor (7) varies as a function of the abscissa z along the interconnection. This implies that it is a priori not possible to model propagation in the interconnection using a uniform multiconductor transmission line (a uniform multiconductor transmission line being a multiconductor transmission line having uniform electrical characteristics over its length) having n+2=6 conductors.

Another pseudo-differential device for transmission providing m=4 transmission channels is shown in FIG. 7, this device comprising:

an interconnection (1) having n=4 transmission conductors (11) (12) (13) (14) plus a common conductor (10) distinct from the reference conductor (7);

a transmitting circuit (5) receiving at its input the signals of the 4 channels of the source (2);

a receiving circuit (6) having its output connected to the destination (3);

a termination (4), as in the patent of the U.S. Pat. No. 6,195,395 entitled "Multi-agent pseudo-differential signaling scheme".

In FIG. 7, the termination (4) is made of n=4 resistors (401) (402) (403) (404) each connected between a transmission conductor and ground and of a resistor (410) connected between the common conductor (10) and the reference conductor (7). In some cases, said resistor (410) connected between the common conductor (10) and the reference conductor (7) might not be present. In FIG. 7, instead of being connected to ground, the resistors of the termination (4) could be connected to a node intended to present a fixed voltage with respect to ground, for instance a power supply voltage. This technique is for instance used in the pseudo-differential signaling scheme using integrated circuits of the Gunning Transceiver Logic (GTL) family, which is well known to specialists. Each resistor connected to a conductor of the interconnection (1) could also be replaced with another known type of termination (see for instance the chapter 6 of the above-mentioned book of H. W. Johnson and M. Graham), for instance a split termination (also referred to as "Thevenin termination") comprising 2 resistors, the first resistor being inserted between this conductor of the interconnection and ground, the second resistor being inserted between this conductor of the interconnection and a node presenting a fixed voltage with respect to ground.

In FIG. 7, since a grounded termination (4) is used to avoid the reflection of signals propagating along the interconnection (1), it is clear for the specialist that the interconnection must be designed in such a way that it is possible to model the propagation in the interconnection using a multiconductor transmission line having n+2=6 conductors, the multiconductor transmission line having uniform electrical characteristics over its length, the multiconductor transmission line using as variables the n+1 natural voltages (which are defined with respect to the reference conductor) and the n+1 natural currents flowing in the transmission conductors and in the common conductor. This result is typically obtained with a geometry of the interconnection (1) and the reference conductor (7) such that the cross section of the interconnection (1) and the reference conductor (7), in a plane orthogonal to the direction of propagation, does not vary over the greatest part of the length of the interconnection, in the vicinity of the transmission conductors. In order to indicate this requirement, the reference conductor (7) is, in FIG. 7, represented as a uniform geometrical shape, such that the distance between the conductors of the interconnection (1) and the reference conductor (7) does not vary as a function of the abscissa z along the interconnection. In FIG. 7, the use of a termination (4) made of resistors connected to ground for avoiding the reflection of signals propagating along the interconnection (1) also implies that this termination should provide an impedance matrix not too different from the characteristic impedance matrix of said multiconductor transmission line having n+2 conductors. The specialists understand that this may happen only if the characteristic impedance matrix of said multiconductor transmission line having n+2 conductors is such that the absolute value of each of the diagonal components is much larger than the absolute value of each of the non-diagonal components, in a suitable frequency band. This implies that the transmission conductors are in a way closer to the reference conductor (7) than to the common conductor (10).

Said French patent application Ser. No. 07/05260 and the corresponding international application provide an analysis of the scheme shown in FIG. 7. They show that, in the scheme shown in FIG. 7, there is a discrepancy between an effective protection against external crosstalk which implies that the transmission conductors are in a way closer to the common conductor than to the reference conductor, and an effective reduction of reflections which implies that the transmission conductors are in a way closer to the reference conductor than to the common conductor.

Said French patent application Ser. No. 07/05260 and the corresponding international application also describe a method for pseudo-differential transmission providing m transmission channels, where m is an integer greater than or equal to 2, through an interconnection having n transmission conductors and a return conductor distinct from the reference conductor, n being an integer greater than or equal to m, the interconnection being structurally combined with the reference conductor throughout the length of the interconnection. A device implementing this method is shown in FIG. 8, this device providing m=4 transmission channels comprising an interconnection (1) having n=4 transmission conductors (11) (12) (13) (14) and a return conductor (10) distinct from the reference conductor (7). In FIG. 8, the transmitting circuit (5) receives at its input the signals of the m=4 channels of the source (2), and its 5 output terminals are connected to the conductors of the interconnection (1). The receiving circuit (6) has its 5 input terminals connected to the conductors of the interconnection (1) and it delivers 4 "output signals of the receiving circuit" to the destination (3). The interconnection used in FIG. 8 is such that, in a given frequency band, taking into account the lumped impedances seen by the interconnection and caused by the circuits connected to the interconnection elsewhere than at the ends of the interconnection, it can be modeled as a (n+1)-conductor multiconductor transmission line, said multiconductor transmission line having uniform electrical characteristics over its length, said multiconductor transmission line using the natural voltages referenced to the return conductor and the natural currents as natural electrical variables. Consequently, it is possible to compute, for said multiconductor transmission line and said given frequency band, the characteristic impedance matrix with respect to the return conductor, denoted by $Z_{RC}$. The matrix $Z_{RC}$ is a matrix of size n×n.

As pointed out in said French patent application Ser. No. 07/05260 and the corresponding international application, the characteristic "in said given frequency band, said interconnection may be modeled with a sufficient accuracy as a (n+1)-conductor multiconductor transmission line using the natural voltages referenced to the return conductor and the natural currents as natural electrical variables" is a remarkable property which may be obtained using suitable structures in which the transmission conductors are in a way closer to the return conductor than to the reference conductor. As an example, the FIG. 9 shows a section of the interconnection (1) and of the reference conductor (7) in a plane orthogonal to the direction of propagation for a first suitable structure built in a printed circuit board, which may be referred to as the coplanar-strips-over-return-conductor structure. In the structure shown in FIG. 9, the return conductor (10) is a copper area and the transmission conductors (11) (12) (13) (14) are traces which are clearly closer to the return conductor (10) than to the reference conductor (7). As an example, the FIG. 10 shows a section of the interconnection (1) and of the reference conductor (7) in a plane orthogonal to the direction of propagation for a second suitable structure built in a printed circuit board, which may be referred to as the coplanar-strips-inside-return-conductor structure. In the structure shown in FIG. 10, the return conductor (10) is made of two interconnected copper areas (1001) (1002), and the transmission conductors (11) (12) (13) (14) are traces which are clearly closer to the return conductor (10) than to the reference conductor (7).

Each of the termination circuits (4) used in FIG. 8 is connected to the conductors of the interconnection (1), that is to say to the transmission conductors (11) (12) (13) (14) and the return conductor (10). According to the invention described in said French patent application Ser. No. 07/05260 and the corresponding international application, the impedance matrix of any one of the termination circuits (4) with respect to the return conductor is, in a part of the frequency band used for transmission, approximately equal to a diagonal matrix of size n×n, denoted by $Z_{RL}$. The matrices $Z_{RC}$ and $Z_{RL}$ may be used to compute the matrix of the voltage reflection coefficients of said any one of the termination circuits (4) with respect to the return conductor, denoted by $P_R$. The matrix $P_R$ is a matrix of size n×n. Each of the termination circuits (4) may be proportioned such that each component of $P_R$ has an absolute value less than or equal to $\frac{1}{10}$.

At this point, it is important to note that, in a case where the theory presented in Section III of said article entitled "A New Method for the Reduction of Crosstalk and Echo in Multiconductor Interconnections" can be applied to an interconnection having n transmission conductors and a return conductor distinct from the reference conductor, a (n+2)-conductor multiconductor transmission line is used for modeling the interconnection with the reference conductor. Thus, a characteristic impedance matrix with respect to the reference conductor, denoted by $Z_{GC}$, of size (n+1)×(n+1), is obtained. The termination circuits considered in this theory are connected to ground, and these termination circuits have an impedance matrix with respect to the reference conductor, this matrix being of size (n+1)×(n+1) for an interconnection having n transmission conductors and a return conductor distinct from the reference conductor. Consequently, the multiconductor transmission lines and the termination circuits considered in said article entitled "A New Method for the Reduction of Crosstalk and Echo in Multiconductor Interconnections", in said French patents number 0300064, number 0302814 and number 0303087 and the corresponding international applications are quite different from the multiconductor transmission lines and the termination circuits considered in said French patent application Ser. No. 07/05260 and the corresponding international application.

The fact that, in FIG. 8, $Z_{RL}$ is a matrix of size n×n indicates that, in said given frequency band, each of the termination circuits (4) approximately behaves as if it was not connected to ground, hence as a floating (n+1)-terminal circuit element. The specialist understands that, consequently, in an ideal implementation, each of the termination circuits (4) does not have an impedance matrix with respect to the reference conductor (7). Additionally, the fact that $Z_{RL}$ is a diagonal matrix implies that each of the termination circuits (4) may consist of n passive linear two-terminal circuit elements, each of said passive linear two-terminal circuit elements being connected between the return conductor (10) and one and only one of said transmission conductors (11) (12) (13) (14).

The French patent application Ser. No. 07/04421 of 21 Jun. 2007, entitled "Dispositif d'interface pseudo-différentiel avec circuit de terminaison", corresponding to the international application number PCT/IB2008/051826 of 8 May 2008 (WO 2008/155676), entitled "Pseudo-differential interfacing device having a termination circuit", describes termination circuits such as the one used in FIG. 8, which do not produce return currents flowing mainly in the reference conductor or in a power supply conductor. For instance, a termination circuit (4) suitable for the method shown in FIG. 8, shown in FIG. 5, comprises n=4 signal terminals (101), a common terminal (100) and n resistors (405) (406) (407) (408), each of said resistors being connected between the common terminal (100) and one and only one of said signal terminals (101). Each signal terminal (101) is intended to be connected to a transmission conductor (11) (12) (13) (14) of the interconnection, and the common terminal (100) is intended to be connected to the return conductor (10) of the interconnection. The termination circuit (4) shown in FIG. 5 is characterized, for the interconnection, by an impedance matrix with respect to the return conductor, said impedance matrix with respect to the return conductor being a diagonal matrix of size n×n.

The method of said French patent application Ser. No. 07/05260 and the corresponding international application is very effective for the suppression of all causes of external crosstalk. However, this method does not reduce internal crosstalk. For instance, the article of F. Broydé and E. Clavelier entitled "A new pseudo-differential transmission scheme for on-chip and on-board interconnections" published in the proceedings of the "14$^{ème}$ colloque international sur la compatibilité électromagnétique—CEM 08", which took place in Paris, France, in May 2008, shows that this method does not provide a reduction of internal crosstalk.

DESCRIPTION OF THE INVENTION

The purpose of the method of the invention is the transmission through an interconnection having two or more transmission conductors, the transmission being protected against echo, internal crosstalk and all causes of external crosstalk.

The invention is about a method for transmitting through an interconnection having n transmission conductors and a return conductor distinct from a reference conductor (ground), n being an integer greater than or equal to 2, said method providing, in a known frequency band, m transmission channels each corresponding to a signal to be sent from the input of at least one transmitting circuit to the output of at least one receiving circuit, where m is an integer greater than or equal to 2 and less than or equal to n, said method comprising the steps of:

numbering said transmission conductors from 1 to n and defining, for any integer j greater than or equal to 1 and less than or equal to n, at any given abscissa along said interconnection, a "natural current" of index j as the current flowing in the transmission conductor number j, and a "natural voltage referenced to the return conductor" of index j as the voltage between the transmission conductor number j and said return conductor;

modeling the interconnection, in a part of said known frequency band, taking into account the lumped impedances seen by the interconnection and caused by the circuits connected to the interconnection elsewhere than at the ends of the interconnection, as a (n+1)-conductor multiconductor transmission line, said multiconductor transmission line having uniform electrical characteristics over its length, said multiconductor transmission line using said natural voltages referenced to the return conductor and said natural currents as natural electrical variables, said electrical characteristics being such that the propagation constants of the different propagation modes of said multiconductor transmission line may be considered as equal (or substantially equal) in said part of said known frequency band;

determining, for said multiconductor transmission line and said part of said known frequency band, the characteristic impedance matrix with respect to the return conductor (denoted by $Z_{RC}$);

coupling the terminals of at least one termination circuit to said return conductor and to each of said transmission conductors, said at least one termination circuit being, in said part of said known frequency band, approximately characterized, for said interconnection, by an impedance matrix with respect to the return conductor, said impedance matrix with respect to the return conductor being a non-diagonal matrix of size n×n approximately equal to said characteristic impedance matrix with respect to the return conductor;

using one said transmitting circuit receiving m "input signals of the transmitting circuit" corresponding each to a transmission channel, the output of said transmitting circuit being coupled to at least m of said transmission conductors, the output of said transmitting circuit delivering natural electrical variables, each of said natural electrical variables being mainly determined by one and only one of said "input signals of the transmitting circuit"; and using one said receiving circuit delivering m "output signals of the receiving circuit" corresponding each to a transmission channel, the input of said receiving circuit being coupled to at least m of said transmission conductors and to said return conductor, each of said "output signals of the receiving circuit" being mainly determined by said natural voltages referenced to the return conductor.

Said part of said known frequency band can be any subset of said known frequency band. It is important to clearly distinguish the interconnection, a physical device composed of conductors and insulators, from the model which describes some of its properties, which is here the model of the multiconductor transmission line having uniform electrical characteristics over its length. This model is not capable of describing all interconnections, but it must be suitable for modeling said interconnection, in said part of said known frequency band, with a sufficient accuracy.

According to the invention, said interconnection may be structurally combined with the reference conductor throughout the length of the interconnection. Consequently, if said interconnection is made with a printed circuit board, the reference conductor may be a conductor of the printed circuit board, this conductor being not a part of said interconnection. Consequently, if said interconnection is made with a cable, the reference conductor may be a conductor of the cable (the cable therefore comprises at least n+2 conductors in this case), but the reference conductor is nevertheless not a part of said interconnection.

In particular, said interconnection may be realized without using a cable, for instance an interconnection formed in or on a rigid or flexible printed circuit board (using traces and/or copper areas), or an interconnection formed in or on the substrate of a multi-chip module (MCM) or of an hybrid circuit, or an interconnection formed inside a monolithic integrated circuit.

According to the invention, the return conductor is distinct from the reference conductor. It is therefore important to clarify the concept of distinct conductors, in the framework of the theory of multiconductor transmission lines. In the framework of this theory, a conductor may be made of several sufficiently interconnected conductors. This is for instance the case with the stripline structure well known to the person skilled in the art, in which the reference conductor is made of two ground planes connected the one to the other at many points. By the same token, it is appropriate to treat as a single reference conductor a plurality of conductors between which a low impedance is maintained in said part of said known frequency band, at a sufficient number of points along the direction of propagation. As an example, in a multilayer printed circuit board, the traces of an internal layer, used as transmission conductors, may be routed between a conducting plane used as ground (ground plane) and a conducting plane connected to a power supply voltage (power plane). The person skilled in the art knows that, if a low impedance is maintained between these conducting planes by a sufficient number of decoupling capacitors connected between these conducting planes and spread over along said traces of an internal layer, then the two conducting planes, though at different potentials, indeed behave as a single reference conductor for the propagation of signals at sufficiently high frequencies. The wording "reference conductor" may therefore designate several conductors connected the one to the other at a sufficient number of points along the direction of propagation, through sufficiently low impedances in said part of said known frequency band. The wording "return conductor" may also designate several conductors connected the one to the other at a sufficient number of points along the direction of propagation, through impedances sufficiently low in said part of said known frequency band.

For any integer j greater than or equal to 1 and less than or equal to n, at a given abscissa z along said interconnection, let us use $i_j$ to denote the natural current of index j, that is to say the current flowing in the transmission conductor number j, and let us use $v_{R\,j}$ to denote the natural voltage referenced to the return conductor of index j, that is to say the voltage between the transmission conductor number j and said return conductor. We may define the column-vector $I_R$ of the natural currents $i_1, \ldots, i_n$ and the column-vector $V_R$ of the natural voltages referenced to the return conductor $v_{R\,1}, \ldots, v_{R\,n}$.

According to the invention, the interconnection is modeled as a (n+1)-conductor multiconductor transmission line using said natural voltages referenced to the return conductor and said natural currents as natural electrical variables, with a sufficient accuracy in said part of said known frequency band, taking into account the lumped impedances seen by the interconnection and caused by the circuits connected to the interconnection elsewhere than at the ends of the interconnection. As pointed out above in the prior art section, this is a remarkable property of the method of the invention. It is clear for the specialist that this property implies that all conductors other than the conductors of the interconnection may be neglected when one models propagation in the interconnection and that, in particular, the reference conductor may be neglected when one models propagation in the interconnection.

Said (n+1)-conductor multiconductor transmission line may nevertheless be defined in said known frequency band. It is consequently possible to define, at each abscissa z along the interconnection, at any frequency f in said known frequency band, a per-unit-length impedance matrix $Z_R$ and a per-unit-length admittance matrix $Y_R$, and the applicable telegrapher's equations are:

$$\begin{cases} \dfrac{dV_R}{dz} = -Z_R I_R \\ \dfrac{dI_R}{dz} = -Y_R V_R \end{cases} \quad (1)$$

The (n+1)-conductor multiconductor transmission line defined by the equation (1) uses said natural voltages referenced to the return conductor and said natural currents as variables. These variables are referred to as "natural electrical variables" in contrast to the "modal electrical variables" defined below. $Z_R$ and $Y_R$ are matrices of size n×n.

According to the invention, said multiconductor transmission line has uniform electrical characteristics over its length, said multiconductor transmission line using said natural voltages referenced to the return conductor and said natural currents as natural electrical variables. Consequently, the per-unit-length impedance matrix $Z_R$ and the per-unit-length admittance matrix $Y_R$ are independent from the abscissa z, and the equation (1) implies that the classical results concerning uniform multiconductor transmission lines may be transposed. In particular, the specialist understands that the transposition of said articles of F. Broydé and E. Clavelier published in 2005 and 2006 provides, in said known frequency band, the following definitions for the characteristic impedance matrix with respect to the return conductor and for the transition matrices from modal electrical variables to natural electrical variables.

The specialist understands that the equation (1) may be solved easily using a suitable diagonalization of the matrices $Z_R Y_R$ and $Y_R Z_R$. The eigenvectors obtained in this manner define the propagation modes, and the eigenvalues correspond to the squared propagation constants. More precisely, $Z_R$ and $Y_R$ being symmetrical matrices, $Z_R Y_R$ and $Y_R Z_R$ have the same eigenvalues, and we shall use $T_R$ and $S_R$ to denote two regular matrices such that:

$$\begin{cases} T_R^{-1} Y_R Z_R T_R = D_R \\ S_R^{-1} Z_R Y_R S_R = D_R \end{cases} \quad (2)$$

where $$D_R = \mathrm{diag}_n(\gamma_1^2, \ldots, \gamma_n^2) \quad (3)$$

where
is the diagonal matrix of order n of the eigenvalues of $Y_J Z_R$. These eigenvalues are the squares of the propagation constants $\gamma_j$ for the different propagation modes of said (n+1)-conductor multiconductor transmission line. Each of these propagation constants applies to a wave of a given TEM propagation mode, the wave propagating toward the far-end (that is to say in the direction of increasing z). Each of said propagation constants has the dimensions of the inverse of a length.

Any matrices $T_R$ and $S_R$ satisfying the equations (2) and (3) define a "modal transform" for the natural currents and for the natural voltages referenced to the return conductor, and the results of this transform are called modal currents and modal voltages. If we use $I_{RM}$ to denote the column-vector of the n modal currents $i_{RM\,1}, \ldots, i_{RM\,n}$ and $V_{RM}$ to denote the column-vector of the n modal voltages $v_{RM\,1}, \ldots, v_{RM\,n}$, we get:

$$\begin{cases} V_R = S_R V_{RM} \\ I_R = T_R I_{RM} \end{cases} \quad (4)$$

Consequently, we shall refer to $S_R$ as the "transition matrix from modal voltages to natural voltages", and we shall, refer to $T_R$ as the "transition matrix from modal currents to natural currents" (for comparison with said French patent application Ser. No. 08/04430, it is useful to note that the transition matrix from the basis C to the basis B is called "matrice de passage de la base B à la base C" in French). The wording "modal electrical variable" will indiscriminately designate a modal current or a modal voltage. The matrices $S_R$ and $T_R$ are therefore the transition matrices from modal electrical variables to natural electrical variables.

The equation (2) means that the column-vectors of $S_R$ (respectively, of $T_R$) are linearly independent eigenvectors of $Z_R Y_R$ (respectively, of $Y_R Z_R$), and that, consequently, $S_R$ and $T_R$ are not defined in a unique manner by the equations (2) and (3) alone, because: first the order of the eigenvalues in the equation (3) is arbitrary, and second the choice of eigenvectors corresponding to a degenerate eigenvalue is arbitrary.

According to the invention, the interconnection is proportioned in such a way that the propagation constants of the different propagation modes may be regarded as equal in said part of said known frequency band. If we use $\gamma$ to denote the common value, which may be frequency-dependent, of these propagation constants, the equations (2) and (3) become:

$$\begin{cases} T_R^{-1} Y_R Z_R T_R = \gamma^2 I_n \\ S_R^{-1} Z_R Y_R S_R = \gamma^2 I_n \end{cases} \quad (5)$$

where $I_n$ is the identity matrix of order n. Therefore, we obviously have:

$$Y_R Z_R = Z_R Y_R = \gamma^2 I_n \quad (6)$$

As a consequence, the transition matrix from modal electrical variables to natural electrical variables may be chosen equal to the identity matrix of order n.

As from the equations (1) and (6), it is possible to show that the characteristic impedance matrix of said (n+1)-conductor multiconductor transmission line, referred to as the characteristic impedance matrix with respect to the return conductor and denoted by $Z_{RC}$ is given by:

$$Z_{RC} = \frac{1}{\gamma} Z_R = \gamma Y_R^{-1} \quad (7)$$

In the equation (5), it is possible to use two matrices $S_R$ et $T_R$ such that $$S_R = y_K Z_{RC} T_R \quad (8)$$

where $y_K$ is an arbitrary scalar different from zero, which may depend on the frequency, and which has the dimensions of admittance. In this case, we shall say that the matrices $S_R$ et $T_R$ are associated, and that the eigenvectors contained in $S_R$ and $T_R$ (i.e. the column-vectors of $S_R$ and $T_R$) are associated. In this case, for a wave propagating in a given direction and for any integer $\alpha$ such that $1 \leq \alpha \leq n$, it is possible to show that:

$$v_{RM\alpha} = \frac{\varepsilon}{y_K} i_{RM\alpha} \quad (9)$$

where $\varepsilon$ is equal to 1 if the wave propagates toward the far-end, or to −1 if the wave propagates toward the near-end. This implies that the propagation of the modal voltage $v_{RM\,\alpha}$ and of the modal current $i_{RM\,\alpha}$ can be viewed as the propagation on a ficticious 2-conductor transmission line having the propagation constant $\gamma$ and the characteristic impedance $1/y_K$. As a result, we say that associated eigenvectors provide a total decoupling of the telegrapher's equations, since it allows to define an equivalent circuit for the (n+1)-conductor multiconductor transmission line, comprising n independent 2-conductor transmission lines.

According to the method of the invention, it is possible that each of said natural electrical variables, delivered by one said transmitting circuit and determined by one and only one of said "input signals of the transmitting circuit", is one of said natural voltages referenced to the return conductor. According to the method of the invention, it is possible that each of said natural electrical variables, delivered by one said transmitting circuit and determined by one and only one of said "input signals of the transmitting circuit", is one of said natural currents. According to the method of the invention, once the use of natural voltages referenced to the return conductor or natural currents for the natural electrical variables is decided upon, we may consider that the corresponding transition matrix from modal electrical variables to natural electrical variables has been chosen equal to the identity matrix of order n: this choice allows to consider the chosen natural electrical variables as modal electrical variables. However, this choice applies either to the modal voltages or to the modal currents, if we want that the matrices $S_R$ and $T_R$ are associated.

Of course, the interconnection used in the method of the invention may possibly also be modeled as a (n+2)-conductor multiconductor transmission line, said multiconductor transmission line using natural voltages referenced to ground and natural currents as variables. For such a model, the specialist understands that the interconnection and the reference conductor are taken into account, so that it is necessary to consider, at a given abscissa z along the interconnection:

a) for any integer j greater than or equal to 1 and less than or equal to n, the natural current of index j, denoted by $i_j$;
b) the current flowing in the return conductor, denoted by $i_{n+1}$;
c) for any integer j greater than or equal to 1 and less than or equal to n, the voltage between the transmission conductor number j and said reference conductor, denoted by $v_{Gj}$;

d) the voltage between said return conductor and said reference conductor, denoted by $v_{G\,n+1}$.

We may then define the column-vector $I_G$ of the currents $i_1, \ldots, i_{n+1}$ and the column-vector $V_G$ of the natural voltages referenced to ground $v_{G\,1}, \ldots, v_{G\,n+1}$. When it is possible to define, at each abscissa z along the interconnection, at any frequency f in said part of said known frequency band, a per-unit-length impedance matrix $Z_G$ and a per-unit-length admittance matrix $Y_G$, the applicable telegrapher's equations are:

$$\begin{cases} \dfrac{dV_G}{dz} = -Z_G I_G \\ \dfrac{dI_G}{dz} = -Y_G V_G \end{cases} \quad (10)$$

In equation (10) the matrices $Z_G$ and $Y_G$ are of size $(n+1)\times(n+1)$. We have said above that, according to the invention, the interconnection may be modeled with a sufficient accuracy as a $(n+1)$-conductor multiconductor transmission line. Consequently, the specialist understands that, in equation (10), we may say that, to a sufficient accuracy:

the $v_{G\,j} - v_{G\,n+1}$ depend only on the $i_1, \ldots, i_n$;

the relationships between the $v_{G\,j} - v_{G\,n+1}$ and the $i_1, \ldots, i_n$ are determined by the matrices $Z_R$ and $Y_R$.

As shown in said article entitled "A new pseudo-differential transmission scheme for on-chip and on-board interconnections", it is then possible to prove that there exist a per-unit-length impedance $Z_{RG}$ and a per-unit-length admittance $Y_{RG}$ such that the matrices $Z_G$ and $Y_G$ are, in said part of said known frequency band, approximately given by $$Z_G \approx \begin{pmatrix} Z_{R11}+Z_{RG} & \ldots & Z_{R1n}+Z_{RG} & Z_{RG} \\ \vdots & \ddots & \vdots & \vdots \\ Z_{Rn1}+Z_{RG} & \ldots & Z_{Rnn}+Z_{RG} & Z_{RG} \\ Z_{RG} & \ldots & Z_{RG} & Z_{RG} \end{pmatrix} \quad (11)$$

and $$Y_G \approx \begin{pmatrix} Y_{R11} & \ldots & Y_{R1n} & -\sum_{i=1}^{n}Y_{R1i} \\ \vdots & \ddots & \vdots & \vdots \\ Y_{Rn1} & \ldots & Y_{Rnn} & -\sum_{i=1}^{n}Y_{Rni} \\ -\sum_{i=1}^{n}Y_{Ri1} & \ldots & -\sum_{i=1}^{n}Y_{Rin} & Y_{RG}+\sum_{i=1}^{n}\sum_{j=1}^{n}Y_{Rij} \end{pmatrix} \quad (12)$$

Exact equations for the matrices $Z_G$ and $Y_G$ are provided in the article of F. Broydé and E. Clavelier, entitled "Modeling the interconnection of a pseudo-differential link using a wide return conductor", published in the proceedings of the 13th IEEE Workshop on Signal Propagation on Interconnects, SPI 2009, which was held in Strasbourg, France, in May 2009.

It is important to note that, since we do not assume that said $(n+2)$-conductor multiconductor transmission line has uniform electrical characteristics over its length, $Z_{RG}$ and $Y_{RG}$ may vary with z. For the $(n+2)$-conductor multiconductor transmission line defined by the equation (10), it is possible to define two invertible matrices of size $(n+1)\times(n+1)$, denoted by $T_G$ and $S_G$, as:

$$\begin{cases} T_G^{-1} Y_G Z_G T_G = D_G \\ S_G^{-1} Z_G Y_G S_G = D_G \end{cases} \quad (13)$$

where $D_G$ is the diagonal matrix of order n+1 of the eigenvalues of $Y_G Z_G$. Thus, $T_G$ and $S_G$ are the transition matrices from modal electrical variables to natural electrical variables for the $(n+2)$-conductor multiconductor transmission line used to model the interconnection with the reference conductor. $T_G$ and $S_G$ are consequently the transition matrices from modal electrical variables to natural electrical variables which are defined and used in said French patents number 0300064, number 0302814 and number 0303087, the corresponding international applications and said article entitled "A New Method for the Reduction of Crosstalk and Echo in Multiconductor Interconnections".

The matrices $Z_G$ and $Y_G$ may also be used to define a characteristic impedance matrix of the $(n+2)$-conductor multiconductor transmission line, denoted by $Z_{GC}$. $Z_{GC}$ is a matrix of size $(n+1)\times(n+1)$ and is of course different from $Z_{RC}$. For instance, said article entitled "A new pseudo-differential transmission scheme for on-chip and on-board interconnections" shows that, if the equations (11) and (12) are exact, we have:

$$Z_{GC} = \begin{pmatrix} Z_{RC} + \sqrt{\dfrac{Z_{RG}}{Y_{RG}}}\begin{pmatrix}1\\ \vdots \\ 1\end{pmatrix}(1 \ldots 1) & \sqrt{\dfrac{Z_{RG}}{Y_{RG}}}\begin{pmatrix}1\\ \vdots \\ 1\end{pmatrix} \\ \sqrt{\dfrac{Z_{RG}}{Y_{RG}}}(1 \ldots 1) & \sqrt{\dfrac{Z_{RG}}{Y_{RG}}} \end{pmatrix} \quad (14)$$

According to the invention, said at least one termination circuit is, in said part of said known frequency band, approximately characterized, for said interconnection, by an impedance matrix with respect to the return conductor. Let us use $Z_{RA}$ to denote this impedance matrix with respect to the return conductor. According to the invention, $Z_{RA}$ is a matrix of size n×n. This indicates that, in said part of said known frequency band, said at least one termination circuit approximately behaves as if it was not connected to ground, hence as a floating (n+1)-terminal circuit element. The specialist understands that, consequently, in an ideal implementation, said at least one termination circuit may be such that it does not have an impedance matrix with respect to the reference conductor. According to the invention, $Z_{RA}$ is a non-diagonal square matrix approximately equal to $Z_{RC}$. The specialist understands that this requirement implies that said at least one termination circuit has the following properties:

it provides very low reflections for all signals propagating inside said (n+1)-conductor multiconductor transmission line and incident on the termination circuit;

it does not reduce the reflections for the noise propagating in the circuit formed by the interconnection and the reference conductor.

The specialist understands that a termination circuit having, at a given frequency, an impedance matrix equal to $Z_{RC}$ may be composed of n (n+1)/2 passive linear two-terminal circuits elements, n of said passive linear two-terminal circuit elements being each connected between the return conductor and one and only one of said transmission conductors, n (n−1)/2 of said passive linear two-terminal circuit elements being each connected between two of said transmission conductors. However, the specialist also understands that a termination circuit providing, at a given frequency, an impedance matrix close enough to $Z_{RC}$ may often be composed of less than n (n+1)/2 passive linear two-terminal circuits elements. The suitability of a given termination circuit may for instance be determined using a suitable norm of the matrix $Z_{RA}-Z_{RC}$. For instance, a termination circuit may be proportioned such that all components of the matrix $Z_{RA}-Z_{RC}$ have an absolute value less than a sufficiently small arbitrary value, for instance 3 Ohms. However, it is often more appropriate to determine the suitability of a given termination circuit using a suitable norm of the matrix of the voltage reflection coefficients, with respect to the return conductor, of said termination circuit, denoted by $P_R$ and given by $$P_R = (Z_{RA} - Z_{RC})(Z_{RA} + Z_{RC})^{-1} \quad (15)$$

For instance, at least one termination circuit may be proportioned such that, in said part of said known frequency band, each component of the matrix $P_R$ has an absolute value less than or equal to a sufficiently small arbitrary value, for instance 5/100.

At this point, it is important to note that, in a case where the method for the reduction of internal crosstalk presented in said French patent number 0303087, the corresponding international application, and Section IX of said article entitled "A New Method for the Reduction of Crosstalk and Echo in Multiconductor Interconnections" can be applied to an interconnection having n transmission conductors and a return conductor distinct from the reference conductor, a (n+2)-conductor multiconductor transmission line is used for modeling the interconnection with the reference conductor. Thus, a characteristic impedance matrix equal to said matrix $Z_{GC}$, of size (n+1)×(n+1), is obtained. The termination circuits used in these prior art methods are connected to ground (as shown in FIG. 1 and FIG. 3), and these termination circuits have an impedance matrix with respect to the reference conductor, this matrix being of size (n+1)×(n+1), this matrix approximating $Z_{GC}$. Consequently, the termination circuits considered in these prior art methods are quite different from the termination circuits used in the invention.

The invention uses a superposition of waves, each of said waves resulting from the propagation of a unique natural electrical variable corresponding to a channel, because, in said part of said known frequency band, each of said waves also resulting from the propagation of a unique modal electrical variable, these waves have the following properties:
a) the wave of a natural electrical variable propagates along said (n+1)-conductor multiconductor transmission line without being coupled to other natural electrical variables of a different index;
b) at an end of said interconnection where said interconnection is connected to a termination circuit defined above, an incident wave of a natural electrical variable does not give rise to any significant reflected wave.

These properties show that the propagation of waves each corresponding to a single natural electrical variable, produced in one of the transmitting circuits and used in one of the receiving circuits, enables transmission without internal crosstalk between the channels. In some cases, it is not necessary, for implementing the method of the invention, to perform linear combinations of signals in the transmitting circuits and/or in the receiving circuits, as we shall see below.

In order that the method provides the desired characteristics, it is important that the interconnection behaves, in said part of said known frequency band, taking into account the lumped impedances seen by the interconnection and caused by the circuits connected to the interconnection elsewhere than at the ends of the interconnection, as a (n+1)-conductor multiconductor transmission line, said multiconductor transmission line having uniform electrical characteristics over its length, said multiconductor transmission line using said natural voltages referenced to the return conductor and said natural currents as natural electrical variables. In some cases, in order to take into account the lumped impedances seen by the interconnection and caused by the circuits connected to it elsewhere than at its ends, the designer need only observe that they are not present or that they may be ignored. In other cases, in order to take into account the lumped impedances seen by the interconnection and caused by the circuits connected to it elsewhere than at its ends, the designer must quantitatively consider these lumped impedances to obtain a (n+1)-conductor multiconductor transmission line having sufficiently uniform electrical characteristics over its length.

In order that the method provides the desired characteristics, it is also important that the propagation constants of the different propagation modes of said (n+1)-conductor multiconductor transmission line may be considered as substantially equal in said part of said known frequency band. The specialist sees that this requirement can for instance be met in the case where the four following characteristics are simultaneously obtained:
the lumped impedances seen by the interconnection and caused by the circuits connected to it elsewhere than at its ends may be ignored,
losses may be ignored,
the field lines of the electric field produced by the transmission conductors essentially see a medium of homogeneous permittivity, and
the field lines of the magnetic field produced by the transmission conductors essentially see a medium of homogeneous permeability.

In particular, the last two characteristics are obtained when the proportioning of the interconnection is such that, in a section of the interconnection in a plane orthogonal to the direction of propagation, the medium surrounding the transmission conductors has homogeneous permittivity and permeability, up to a sufficient distance from the transmission conductors.

In particular, the last two characteristics may be obtained when the proportioning of the interconnection is such that, in a section of the interconnection in a plane orthogonal to the direction of propagation, the return conductor completely or almost completely surrounds the transmission conductors, and such that the medium surrounding the transmission conductors inside the return conductor has homogeneous permittivity and permeability. For instance, in the "coplanar-strips-inside-return-conductor" structure shown in FIG. 10, this condition may be met if an homogeneous dielectric is used between the two interconnected copper areas (1001) (1002) forming the return conductor (10).

It is also possible to use lumped impedances seen by the interconnection and caused by the circuits connected to it elsewhere than at its ends to obtain that said (n+1)-multiconductor transmission line is such that the propagation constants of its propagation modes are substantially equal in said part of said known frequency band. For instance, if we consider that the $Z_R$ matrix is defined by the geometry of the conductors of the interconnection, it is possible to use lumped capacitances arranged along the interconnection, between some of its conductors, to obtain a $Y_R$ matrix such that equation (6) is satisfied with enough accuracy, up to a given maximum frequency.

The function of the termination circuits is to ensure that no reflection of an incident signal occurs at a disturbing level at an end of the interconnection, for the signals propagating inside said (n+1)-conductor multiconductor transmission line, in said part of said known frequency band. It is clear that the lower the desired maximum crosstalk coupling level, the lower will be the level of reflection of incident signals which will have to be regarded as disturbing, and that, in order not to exceed this level, it must be specified that the termination circuit must have a matrix $Z_{RA}$ closer to $Z_{RC}$.

According to the invention, in order to ensure that no reflection of an incident signal occurs at a disturbing level at an end of the interconnection for the signals propagating in said (n+1)-conductor multiconductor transmission line, the specialist understands that it is sufficient, when one or more transmitting circuits are connected at a single end of the interconnection, to arrange a termination circuit at the other end of the interconnection. The specialist also sees that in all other cases, that is to say when a transmitting circuit is connected elsewhere than at one end of the interconnection, and/or when transmitting circuits are connected at both ends of the interconnection, it is necessary to arrange a termination circuit at both ends of the interconnection. Thus, according to the method of the invention, we may either arrange a termination circuit at one end only of the interconnection, or arrange a termination circuit at each end of the interconnection. If we use a to denote the number of termination circuits used, we therefore have a=1 or a=2.

According to the invention, the number m of transmission channels between any one of the transmitting circuits and any one of the receiving circuits may be equal to the number n of transmission conductors. This method is preferred because it is generally the most economical. However, it is also conceivable to use a number n of transmission conductors that is greater than the number m of transmission channels.

According to the invention, the output of one of said transmitting circuits delivers natural electrical variables, each of said natural electrical variables being mainly determined by one and only one of said m "input signals of the transmitting circuit". This must be interpreted in a broad sense, as: each of said natural electrical variables is mainly determined, at each point in time, by the history, up to said point in time, of one and only one of said m "input signals of the transmitting circuit".

According to the invention, one of said receiving circuits delivers "output signals of the receiving circuit", each of said "output signals of the receiving circuit" being mainly determined by said natural voltages referenced to the return conductor present on the interconnection. This must be interpreted in a broad sense, as: each of said "output signals of the receiving circuit" is mainly determined, at each point in time, by the history, up to said point in time, of said natural voltages referenced to the return conductor present on the interconnection.

The specialists know, for instance from a computation based on the geometry of the conductors and insulators, on the conductivity of the conductors and on the permittivity and the losses of the insulators, how to determine the matrices $Z_G$ and $Y_G$ of a multiconductor transmission line used for modeling the interconnection and the reference conductor, as a function of frequency. The specialists also know how to measure these matrices. It is therefore clear that it is possible to proportion the conductors of a suitable structure such that:

the equations (11) and (12) are satisfied to a sufficient accuracy in said part of said known frequency band;

the matrices $Z_R$ and $Y_R$ obtained from the equations (11) and (12) are independent of z;

one obtains a matrix $Z_{RC}$ approximating, in said part of said known frequency band, a wanted matrix.

Consequently, the method of the invention may be such that, prior to modeling said interconnection, one proportions said interconnection in such a way that it may, with a sufficient accuracy in said part of said known frequency band, taking into account the lumped impedances seen by the interconnection and caused by the circuits connected to the interconnection elsewhere than at the ends of the interconnection, be modeled as a (n+1)-conductor multiconductor transmission line, said multiconductor transmission line having uniform electrical characteristics over its length, said multiconductor transmission line using said natural voltages referenced to the return conductor and said natural currents as natural electrical variables, said electrical characteristics being such that the propagation constants of the different propagation modes of said (n+1)-conductor multiconductor transmission line may be considered as substantially equal in said part of said known frequency band.

We note that, in many cases, we can consider that, when computing the matrix $Z_{RC}$ of said (n+1)-conductor multiconductor transmission line, the losses are negligible in some frequency bands, for instance when said part of said known frequency band is above 1 MHz. In this case, in said part of said known frequency band, $Z_{RC}$ is real and frequency-independent. At lower frequencies, for instance when said part of said known frequency band contains frequencies below 1 MHz, losses are often not negligible and $Z_{RC}$ cannot be considered as real, which obviously leads to a more complex implementation of the method of the invention. However, this question can often be disregarded, because crosstalk and echo at low frequencies may in many cases be ignored, and because, in these cases, it may be of no importance that the termination circuits arranged at one end or both ends of the interconnection present an impedance matrix near $Z_{RC}$ at these frequencies. Consequently, said part of said known frequency band will often be contained in the interval of the frequencies ranging from 1 MHz to 100 GHz.

However, the frequency above which losses may possibly be neglected for the computation of the matrix $Z_{RC}$ of said (n+1)-conductor multiconductor transmission line depends on the shape and position of the conductors in a section of the interconnection in a plane orthogonal to the direction of propagation and on the conductivity of the conductors. We note that in the case of on-chip interconnects, this frequency may be much higher than 1 MHz, for instance above 1 GHz.

Since, according to the invention, the properties of said (n+1)-conductor multiconductor transmission line may be defined arbitrarily outside said part of said known frequency band, it is possible to obtain that $Z_{RC}$ is real and frequency-independent over said known frequency band, when $Z_{RC}$ is real and frequency-independent over said part of said known frequency band. When $Z_{RC}$ is real and frequency-independent over said known frequency band, the matrix $Z_{RC}$ may be realized with a network of n(n+1)/2 resistors or less.

We now describe a device for proportioning a device for implementing the method of the invention. A device for proportioning a device for transmitting through an interconnection having n transmission conductors and a return conductor distinct from a reference conductor, n being an integer greater than or equal to 2, said device for transmitting through an interconnection providing, in a known frequency band, m transmission channels, where m is an integer greater than or equal to 2 and less than or equal to n, may comprise:

means for modeling the interconnection, in a part of said known frequency band, taking into account the lumped impedances seen by the interconnection and caused by the circuits connected to the interconnection elsewhere than at the ends of the interconnection, as a (n+1)-conductor multiconductor transmission line, said multiconductor transmission line having uniform electrical characteristics over its length, said multiconductor transmission line using the natural voltages referenced to the return conductor and the natural currents as natural electrical variables, said electrical characteristics being such that the propagation constants of the different propagation modes of said multiconductor transmission line may be considered as equal (or substantially equal) in said part of said known frequency band;

means for determining, for said multiconductor transmission line and said part of said known frequency band, the characteristic impedance matrix with respect to the return conductor $Z_{RC}$;

means for proportioning a termination circuit, said termination circuit being, in said part of said known frequency band, approximately characterized, for said interconnection, by an impedance matrix with respect to the return conductor, said impedance matrix with respect to the return conductor being a non-diagonal matrix of size n×n approximately equal to said characteristic impedance matrix with respect to the return conductor;

means for proportioning a transmitting circuit, said transmitting circuit receiving m "input signals of the transmitting circuit", the output of said transmitting circuit being coupled to at least m of said transmission conductors, the output of said transmitting circuit delivering natural electrical variables, each of said natural electrical variables being mainly determined by one and only one of said "input signals of the transmitting circuit"; and means for proportioning a receiving circuit, said receiving circuit delivering m "output signals of the receiving circuit", the input of said receiving circuit being coupled to at least m of said transmission conductors and to said return conductor, each of said "output signals of the receiving circuit" being mainly determined by said natural voltages referenced to the return conductor.

Said device for proportioning a device for transmitting through an interconnection having n transmission conductors and a return conductor distinct from the reference conductor may comprise a computer running a suitable program.

Said device for proportioning a device for transmitting through an interconnection having n transmission conductors and a return conductor distinct from the reference conductor may be such that the means for modeling the interconnection comprise means for measuring and/or for computing the real electrical characteristics of the interconnection, based on the relative layout of the transmission conductors and of the return conductor and on the characteristics of the dielectrics surrounding the transmission conductors and the return conductor.

Said device for proportioning a device for transmitting through an interconnection having n transmission conductors and a return conductor distinct from the reference conductor may be such that the means for modeling the interconnection comprise:

means for calculating one or more error coefficients for estimating the difference between the actual electrical characteristics of the interconnection and the desired characteristics, for said part of said known frequency band; and means for optimizing the relative position of the transmission conductors and the return conductor by minimizing the error coefficient(s).

We now describe a device for implementing the method of the invention. A device for transmission providing, in a known frequency band, m transmission channels each corresponding to a signal to be sent from the input of at least one transmitting circuit to the output of at least one receiving circuit, where m is an integer greater than or equal to 2, comprises:

an interconnection having n transmission conductors and a return conductor distinct from a reference conductor, n being an integer greater than or equal to m, the interconnection being such that the interconnection can be modeled, in a part of said known frequency band, taking into account the lumped impedances seen by the interconnection and caused by the circuits connected to the interconnection elsewhere than at the ends of the interconnection, as a (n+1)-conductor multiconductor transmission line, said multiconductor transmission line having uniform electrical characteristics over its length, said multiconductor transmission line using the natural voltages referenced to the return conductor and the natural currents as natural electrical variables, said electrical characteristics being such that the propagation constants of the different propagation modes of said multiconductor transmission line may be considered as equal (or substantially equal) in said part of said known frequency band;

at least one said transmitting circuit receiving m "input signals of the transmitting circuit" corresponding each to a transmission channel, the output of said at least one said transmitting circuit being coupled to at least m of said transmission conductors, the output of said at least one said transmitting circuit delivering natural electrical variables when said at least one said transmitting circuit is in the activated state, each of said natural electrical variables being mainly determined by one and only one of said "input signals of the transmitting circuit";

at least one said receiving circuit delivering, when said at least one said receiving circuit is in the activated state, m "output signals of the receiving circuit" corresponding each to a transmission channel, the input of said at least one said receiving circuit being coupled to at least in of said transmission conductors and to said return conductor, each of said "output signals of the receiving circuit" being mainly determined by said natural voltages referenced to the return conductor; and at least one termination circuit coupled to said return conductor and to each of said transmission conductors, said at least one termination circuit being, when said at least one termination circuit is in the activated state, approximately characterized, for said interconnection, at at least one quiescent operating point, for small signals in said part of said known frequency band, by an impedance matrix with respect to the return conductor, denoted by $Z_{RL}$, said impedance matrix with respect to the return conductor being a non-diagonal matrix of size n×n approximately equal to the characteristic impedance matrix with respect to the return conductor of said (n+1)-conductor multiconductor transmission line.

Said interconnection may be structurally combined with the reference conductor throughout the length of the interconnection.

In the following, the wordings "is in the deactivated state" and "is not in the activated state" are equivalent. According to the invention, it is possible that there is a deactivated state for one or more of said transmitting circuits, in which the behavior of this transmitting circuit is different from the one defined above. However, the existence of a deactivated state for one or more of said transmitting circuits is not at all a characteristic of the invention. According to the invention, it is possible that there is a deactivated state for one or more of said receiving circuits, in which the behavior of this receiving circuit is different from the one defined above. However, the existence of a deactivated state for one or more of said receiving circuits is not at all a characteristic of the invention. According to the invention, it is possible that there is a deactivated state for one or more of said termination circuits, in which the behavior of this termination circuit is different from the one defined above. However, the existence of a deactivated state for one or more of said termination circuits is not at all a characteristic of the invention.

According to the invention, the "input signals of the transmitting circuit" may be analog or digital signals. A transmitting circuit used in a device for implementing the method of the invention may use analog signal processing and/or digital signal processing to deliver said modal electrical variables. According to the invention, the "output signals of the receiving circuit" may be analog or digital signals. A receiving circuit used in a device for implementing the method of the invention may use analog signal processing and/or digital signal processing to deliver said "output signals of the receiving circuit".

For a termination circuit used in a device for implementing the method of the invention, the requirement relating to $Z_{RL}$, namely that $Z_{RL}$ must be a non-diagonal matrix of size n×n approximately equal to $Z_{RC}$, should be applicable to the normal operation of the device for implementing the method of the invention. Said quiescent operating point chosen for determining $Z_{RL}$ should therefore be such that the quiescent voltages between each of said transmission conductors and said return conductor have values which may appear at a given point in time under normal operation.

A termination circuit used in a device for implementing the method of the invention may be such that it behaves as a linear circuit for the interconnection. Consequently, said at least one termination circuit coupled to said return conductor and to each of said transmission conductors may be such that said at least one termination circuit is, in said part of said known frequency band, when said at least one termination circuit is in the activated state, approximately characterized, for said interconnection, by an impedance matrix with respect to the return conductor, denoted by $Z_{RL}$, said impedance matrix with respect to the return conductor being a non-diagonal matrix of size n×n approximately equal to the characteristic impedance matrix with respect to the return conductor of said (n+1)-conductor multiconductor transmission line.

In a device for implementing the method of the invention, said interconnection may in particular be realized without using a cable, as explained above.

In a device for implementing the method of the invention, it is possible that the number m of transmission channels between one of said transmitting circuits and one of said receiving circuits is equal to the number n of transmission conductors. Such a device is preferred because it provides the largest number of transmission channels for a given interconnection. However, it is also conceivable to use a number n of transmission conductors greater than the number m of transmission channels. In particular, n may be greater than or equal to three.

In a device for implementing the method of the invention, it is possible that each of said termination circuits is arranged at an end of said interconnection. This arrangement is preferred because specialists understand that it is the best technique for eliminating reflections of signals propagating in said (n+1)-conductor multiconductor transmission line.

A device for implementing the method of the invention may be such that said termination circuits, said transmitting circuits and said receiving circuits are without any part in common to any two of them. Conversely, a device for implementing the method of the invention may be such that said termination circuits, said transmitting circuits and said receiving circuits are not without any part in common to any two of them.

A device for implementing the method of the invention, thanks to the characteristics specified for the interconnection and for the terminations, uses the return conductor as a return path for the return current produced by the currents flowing in the n transmission conductors, like the invention described in said French patent application Ser. No. 07/05260 and the corresponding international application. Moreover, the return conductor as defined in the invention is used by the receiving circuits for delivering the "output signals of the receiving circuit". Consequently, it is appropriate to consider that the method of the invention and the device for implementing the method of the invention are pseudo-differential.

According to the invention, it is specified that it must be possible to model the interconnection as a multiconductor transmission line having uniform electrical characteristics over its length, in said part of said known frequency band, taking into account the lumped impedances seen by the interconnection and caused by the circuits connected to it elsewhere than at its ends. In order to take these lumped impedances into account by merely stating that they are not present or that they may be ignored, these circuits must be such that they do not disturb the propagation along the multiconductor transmission line. The person skilled in the art sees that this result can for instance be obtained by:

using transmitting circuits connected in series with the conductors of the interconnection, and showing a low series impedance;

using transmitting circuits connected in parallel with the conductors of the interconnection, and showing a high parallel impedance;

using receiving circuits connected in parallel with the conductors of the interconnection, and showing a high parallel impedance.

Connecting the transmitting circuits in parallel with the interconnection is simpler than connecting them in series. The parallel connection is therefore a priori preferred.

Let us consider, as a non-limiting example, the case where m=n and where each of said natural electrical variables, delivered by one of said transmitting circuits and determined by one and only one of said "input signals of the transmitting circuit", is one of said natural voltages referenced to the return conductor. Let us use $V_R$ to denote the column-vector of the natural voltages referenced to the return conductor produced by said one of said transmitting circuits. In our example, each component of $V_R$ is mainly determined, at each point in time, by the history, up to said point in time, of one and only one of said "input signals of the transmitting circuit". If said one of said transmitting circuits is connected in series with the conductors of the interconnection and presents a low series impedance, and if we use $V_{TX}$ to denote the column-vector of the voltages applied to each transmission conductor by said one of said transmitting circuits, we must have:

$$V_{TX} = \pm a V_R \quad (16)$$

where a is the number of termination circuits used, as explained above, and where the sign depends on the position with respect to said one of said transmitting circuits. If, on the contrary, said one of said transmitting circuits is connected in parallel with the conductors of the interconnection and presents a high parallel impedance, and if we use $I_{TX}$ to denote the column-vector of the currents injected into each transmission conductor by said one of said transmitting circuits, we must have:

$$I_{TX} = a Z_{RC}^{-1} V_R \quad (17)$$

We see that, according to the equation (17), the transmitting circuit presenting a high parallel impedance must, for obtaining said natural voltages referenced to the return conductor, perform linear combinations of signals, one or more of said linear combinations being such that two or more of the coefficients of said one or more of said linear combinations are not equal to zero, because $Z_{RC}^{-1}$ is not a diagonal matrix. In our example, a pseudo-differential receiving circuit may directly sense said natural voltages referenced to the return conductor delivered by said one of said transmitting circuits.

Let us consider, as a non-limiting example, the case where m=n and where each of said natural electrical variables, delivered by one of said transmitting circuits and determined by one and only one of said "input signals of the transmitting circuit", is one of said natural currents. Let us use $I_R$ to denote the column-vector of the natural currents produced by said one of said transmitting circuits. In our example, each component of $I_R$ is mainly determined, at each point in time, by the history, up to said point in time, of one and only one of said "input signals of the transmitting circuit". If said one of said transmitting circuits is connected in parallel with the conductors of the interconnection and presents a high parallel impedance, and if we use $I_{TX}$ to denote the column-vector of the currents injected in each transmission conductor by said one of said transmitting circuits, we must have:

$$I_{TX} = \pm a I_R \quad (18)$$

where the sign depends on the position with respect to said one of said transmitting circuits. If, on the contrary, said one of said transmitting circuits is connected in series with the conductors of the interconnection and presents a low series impedance, and if we use $V_{TX}$ to denote the column-vector of the voltages applied to each transmission conductor by said one of said transmitting circuits, we must have:

$$V_{TX} = a Z_{RC} I_R \quad (19)$$

We see that, according to the equation (19), the transmitting circuit presenting a low series impedance must, for obtaining said natural currents, perform linear combinations of signals, one or more of said linear combinations being such that two or more of the coefficients of said one or more of said linear combinations are not equal to zero, because $Z_{RC}$ is not a diagonal matrix. In our example, a pseudo-differential receiving circuit sensing the natural voltages referenced to the return conductor of the column-vector $V_{RX}$ must perform the linear combinations of signals of the product $Z_{RC}^{-1} V_{RC}$ to obtain the "output signals of the receiving circuit", one or more of said linear combinations being such that two or more of the coefficients of said one or more of said linear combinations are not equal to zero, because $Z_{RC}^{-1}$ is not a diagonal matrix.

Consequently, in the case where the natural electrical variables delivered by said transmitting circuits are natural voltages referenced to the return conductor, it is possible that said receiving circuits do not perform linear combinations, having two or more non-zero coefficients, of signals.

Consequently, in the case where said transmitting circuits use the equation (16) or the equation (18), it is possible that said transmitting circuits do not perform linear combinations, having two or more non-zero coefficients, of signals.

Conversely, it is possible that, in a device for implementing the method of the invention, linear combinations, having two or more non-zero coefficients, of signals are performed in one or more of said transmitting circuits and/or in one or more of said receiving circuits.

According to the invention, the "input signals of the transmitting circuit" may be analog or digital signals. A transmitting circuit used in a device for implementing the method of the invention may use analog signal processing and/or digital signal processing to deliver said natural electrical variables. According to the invention, the "output signals of the receiving circuit" may be analog or digital signals. A receiving circuit used in a device for implementing the method of the invention may use analog signal processing and/or digital signal processing to deliver said "output signals of the receiving circuit".

According to the invention, it is possible that the section of the interconnection in a plane orthogonal to the direction of propagation does not change, except for a scale factor, over the greatest part of the length of the interconnection, in the vicinity of the transmission conductors.

One or more of said termination circuits of a device for implementing the method of the invention may for instance be a termination circuit defined in said French patent application Ser. No. 08/03876 and the corresponding international application, having n signal terminals and a common terminal, each of said signal terminals being connected to one and only one of said transmission conductors, each of said transmission conductors being connected to one and only one of said signal terminals, said common terminal being connected to said return conductor. Consequently, a device for implementing the method of the invention may be such that at least one said termination circuit is, when said at least one said termination circuit is in the activated state, approximately equivalent, for said transmission conductors and said return conductor, to a (n+1)-terminal network such that, at at least one quiescent operating point, for small signals in said part of said known frequency band, the impedance matrix with respect to said common terminal of said (n+1)-terminal network is equal to $Z_{RC}$.

A device for implementing the method of the invention may be such that at least one said termination circuit is made of a network of resistors, n of said resistors being each connected between one of said transmission conductors and said return conductor, one or more of said resistors being each connected between two of said transmission conductors.

A termination circuit made of a network of resistors is however not at all a characteristic of the invention. By way of a first example, designers may, in order to reduce the power consumed by one of said termination circuits, choose to allow this termination circuit to be effective only in a relevant interval of frequencies, for instance by including suitable reactive circuit elements in this termination circuit. By way of a second example, one of said termination circuits could include active components, for instance insulated gate field-effect transistors (MOSFETs) operating in the ohmic regime. The impedance of the channel of such components may be adjustable by electrical means. Consequently, a device for implementing the method of the invention may be such that the impedance matrix with respect to the return conductor, of at least one said termination circuit in the activated state, can be adjusted by electrical means.

In the case where one of said termination circuits has an activated state and a deactivated state, the impedance of the channel of one or more MOSFETs may for instance be controlled by one or more control signals taking on different values in the activated state and in the deactivated state. Consequently, at least one of said termination circuits may be such that said termination circuit has an activated state and a deactivated state, the impedance matrix, with respect to said return conductor, of said termination circuit in the activated state being different from the impedance matrix, with respect to said return conductor, of said termination circuit in the deactivated state.

In the case where one of said termination circuits has an activated state and a deactivated state, components such as transistors may for instance be used as switches having a closed state and an open state. In this case, said transistors may for instance be in the closed state when this termination circuit is in the activated state, and be in the open state when this termination circuit is in the deactivated state. Consequently, it is possible that at least one said termination circuit has an activated state and a deactivated state, each current flowing from said at least one said termination circuit to one of said transmission conductors being substantially zero when said at least one said termination circuit is in the deactivated state. Designers may, in order to reduce the power consumed by such a termination circuit, choose to put this termination circuit in the deactivated state when a transmitting circuit close to the termination circuit is in the activated state.

According to the invention, at least one termination circuit is such that $Z_{RL}$ is a matrix of size n×n. This implies that this termination circuit in the activated state approximately behaves, for the interconnection, as if it was not connected to said reference conductor. However, a device for implementing the method of the invention may further comprise one or more damping circuits coupled to said return conductor, each of said damping circuits being, for said return conductor, approximately equivalent to a network consisting of a passive two-terminal circuit element connected in series with a voltage source delivering a constant voltage, said network having a first terminal coupled to said return conductor, said network having a second terminal coupled to said reference conductor (ground). Since the invention does not use signals applied between the return conductor and ground, the function of said damping circuits is not to reduce the reflections of signals. The specialist understands that said damping circuits are intended to provide a damping of the resonances of the circuit consisting of the return conductor and the reference conductor, which may be excited by the noise produced by unwanted electromagnetic couplings. Said damping circuits may therefore further reduce the effects of unwanted electromagnetic couplings.

Any one of said damping circuits may be such that said passive two-terminal circuit element belonging to said network approximately equivalent to said damping circuit may be considered as linear. Consequently, according to the invention, at least one of said damping circuits may be, for said return conductor, approximately equivalent to a network consisting of a passive linear two-terminal circuit element having a first terminal coupled to said return conductor and a second terminal held at a (positive, negative or zero) fixed voltage with respect to said reference conductor. Such a damping circuit is characterized, at any non-zero frequency, by a scalar impedance between the return conductor and ground.

We observe that the combination of such a damping circuit and of one of said termination circuits in the activated state presents, with respect to said return conductor, at any frequency in said part of said known frequency band, a non-diagonal impedance matrix of size (n+1)×(n+1).

A device for implementing the method of the invention may be such that none of said damping circuits has any part in common with one of said receiving circuits and/or with one of said termination circuits and/or with one of said transmitting circuits. Conversely, a device for implementing the method of the invention may be such that one or more of said damping circuits has one or more parts in common with one of said receiving circuits and/or with one of said termination circuits and/or with one of said transmitting circuits.

According to the invention, one or more of said transmitting circuits and/or one or more of said receiving circuits may have a filtering function, for instance for the purpose of obtaining a pre-emphasis, a de-emphasis or an equalization improving transmission. It then becomes necessary to synthesize the corresponding filters, either as analog filters or as digital filters, using one of the many methods known to specialists.

When losses are not negligible in the interconnection, phase and amplitude distortions may occur, which are referred to as distortions caused by propagation. The reduction of these distortions may be obtained, in a device for implementing the method of the invention, using an equalization reducing the effects of the distortions caused by propagation, said equalization being implemented in one or more of said transmitting circuits and/or in one or more of said receiving circuits. This type of processing, which is also sometimes referred to as compensation, is well known to specialists and may be implemented using analog signal processing or digital signal processing.

Specialists know that it is commonplace to use adaptive algorithms for implementing this type of processing in receivers for data transmission. A device for implementing the method of the invention may use an adaptive equalization. This type of processing is well known to specialists and is often implemented using digital signal processing.

BRIEF DESCRIPTION OF THE DRAWINGS

Other advantages and characteristics of the invention will appear more clearly from the following description of particular embodiments of the invention, given by way of non-limiting examples, with reference to the accompanying drawings in which.

DETAILED DESCRIPTION OF SOME EMBODIMENTS

First Embodiment

Figure 11:
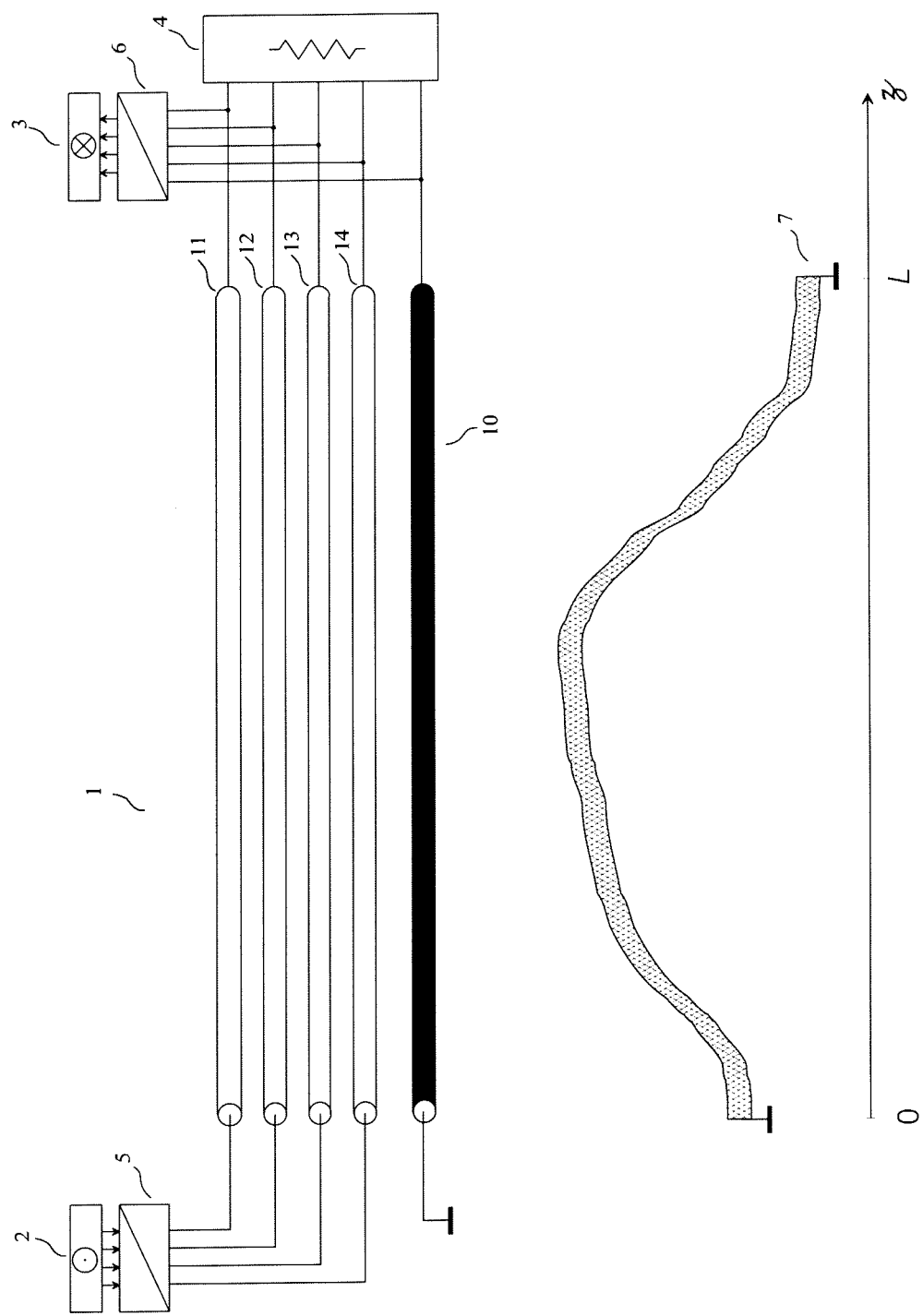
FIG. 11 shows a first embodiment of the invention.

As a first embodiment of a device for implementing the method of the invention, given by way of non-limiting example, we have represented in FIG. 11 a device of the invention comprising an interconnection (1) built using the high-density interconnection technology on a printed circuit board, the interconnection (1) having n=4 transmission conductors (11) (12) (13) (14) and a return conductor (10) distinct from the reference conductor (7). All items shown in FIG. 11 belong to the same printed circuit assembly and the reference conductor (7) is a ground plane of the printed circuit board of this printed circuit assembly. Said transmission conductors (11) (12) (13) (14) are traces built in the printed circuit board, above the reference conductor (7). A transmitting circuit (5) receives at its input the m=4 "input signals of the transmitting circuit" from the m channels of the source (2), and its n output terminals are connected to the transmission conductors (11) (12) (13) (14) of the interconnection (1), at the near-end of the interconnection (1). A termination circuit (4) is connected to the conductors (10) (11) (12) (13) (14) of the interconnection (1), at the far-end of the interconnection (1). A receiving circuit (6) has its n+1=5 input terminals connected to the conductors (10) (11) (12) (13) (14) of the interconnection (1), at the far-end of the interconnection (1). The output of the receiving circuit (6) delivers m "output signals of the receiving circuit" to the destination (3). Thus, the analog or digital signals of the m channels of the source (2) are sent to the m channels of the destination (3).

The termination circuit (4) is such that, in a part of the frequency band used for transmission, the impedance matrix, with respect to the return conductor, of the termination circuit is a non-diagonal matrix of size n×n approximately equal to $Z_{RC}$, $Z_{RC}$ being the characteristic impedance matrix with respect to the return conductor of a (n+1)-conductor multiconductor transmission line used to model the interconnection, as explained above.

The specialist understands that the termination circuit (4) behaves as if it was not connected to ground. Consequently, there is no constraint on the manner of routing the interconnection (1) with respect to ground (7). Consequently, in FIG. 11, the reference conductor (7) is represented as an irregular geometrical shape, which indicates that the distance between the conductors of the interconnection (1) and the reference conductor (7) may vary as a function of the abscissa z along the interconnection.

The transmitting circuit (5) delivers m transmission variables, each of said transmission variables being a voltage between an output terminal of the transmitting circuit (5) and ground. Each output terminal of the transmitting circuit (5) presents a low impedance with respect to ground. Since the return conductor (10) is grounded at the near-end of the interconnection (1), we can say that each of said transmission variables is the voltage between one of said transmission conductors (11) (12) (13) (14) and said return conductor (10). Consequently, each of said transmission variables is a natural electrical variable of said (n+1)-conductor multiconductor transmission line used to model the interconnection. Here, each of said natural electrical variables, delivered by said transmitting circuit and determined by one and only one of said "input signals of the transmitting circuit", is one of said natural voltages referenced to the return conductor, and the operation of said transmitting circuit comply with the equation (16). Consequently, each of said transmission variables delivered by said transmitting circuit (5) is mainly determined by one and only one of said "input signals of the transmitting circuit".

For instance, said transmitting circuit (5) may be made of four single-input and single-output line drivers, each of the line drivers presenting a sufficiently low output impedance.

The receiving circuit (6) delivers m "output signals of the receiving circuit", each of said "output signals of the receiving circuit" being mainly determined by one and only one of said natural voltages referenced to the return conductor.

For instance, said receiving circuit (6) may be a receiving circuit used in the device disclosed in said French patent application Ser. No. 08/03876 and in the corresponding international application. In this case, said termination circuit (4) and said receiving circuit (6) may form a device disclosed in said French patent application Ser. No. 08/03876 and in the corresponding international application.

Figure 10:
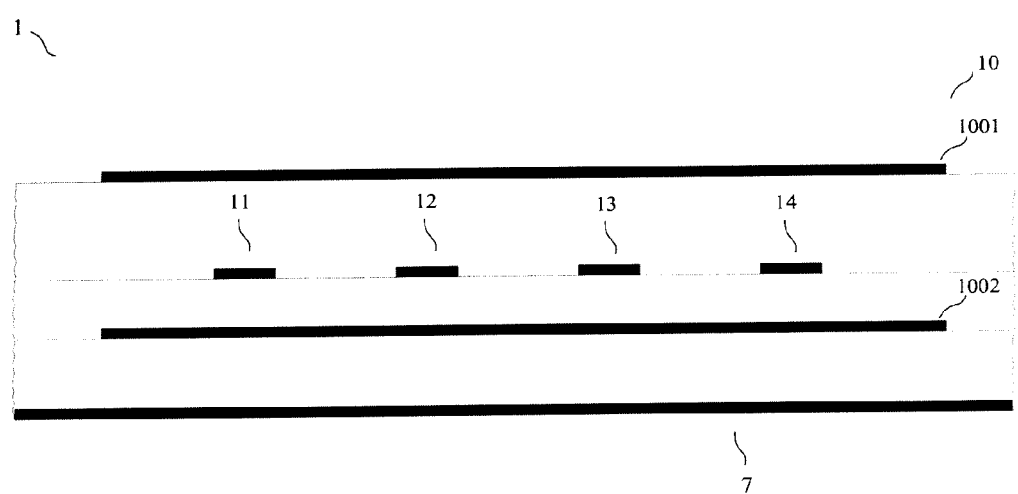
FIG. 10 shows a cross section of an interconnection and of the reference conductor, which may be used in the pseudo-differential device for transmission of the FIG. 8.

The FIG. 10 shows a section of the interconnection (1) and of the reference conductor (7) in a plane orthogonal to the direction of propagation, at a given abscissa z. In this structure, the return conductor (10) is made of two interconnected copper areas (101) (102), and the transmission conductors (11) (12) (13) (14) are traces which are clearly closer to the return conductor (10) than to the reference conductor (7). The interconnection (1) is proportioned in such a way that it can be modeled, with a sufficient accuracy, as a (n+1)-conductor multiconductor transmission line, such that $$Z_R \approx j\omega L_R \text{ with} \quad (20)$$

$$L_R \approx \begin{pmatrix} 305.714 & 24.944 & 2.129 & 0.182 \\ 24.944 & 304.731 & 24.861 & 2.129 \\ 2.129 & 24.861 & 304.731 & 24.944 \\ 0.182 & 2.129 & 24.944 & 305.714 \end{pmatrix} \text{nH/m}$$

and $$Y_R \approx j\omega C_R \text{ with} \quad (21)$$

$$C_R \approx \begin{pmatrix} 102.591 & -8.395 & -0.032 & 0.000 \\ -8.395 & 103.607 & -8.391 & -0.032 \\ -0.032 & -8.391 & 103.607 & -8.395 \\ 0.000 & -0.032 & -8.395 & 102.591 \end{pmatrix} \text{pF/m}$$

The known frequency band used for transmission extends from 0 Hz to 3 GHz. The equations (20) and (21) are applicable to the frequency band 50 MHz to 3 GHz, corresponding to said part of said known frequency band, in which the designer has established that losses may be neglected in the computation of the propagation constants and $Z_{RC}$. However, the designer decides that the equations (20) and (21) define the (n+1)-conductor multiconductor transmission line used to model the interconnection in the known frequency band (that is to say from 0 Hz to 3 GHz). The fact that this (n+1)- conductor multiconductor transmission line is not an accurate model below 50 MHz has no detrimental consequence in this application, because the interconnection being shorter than 0.2 m, it is electrically short below 50 MHz.

Said (n+1)-conductor multiconductor transmission line is therefore such that said per-unit-length impedance matrix $Z_R$ and said per-unit-length admittance matrix $Y_R$ are independent of the abscissa z, and such that the propagation constants of the different propagation modes of said (n+1)-conductor multiconductor transmission line all correspond to a velocity near $1.79160 \times 10^8$ m/s. Consequently, the propagation constants of the different propagation modes of said (n+1)-conductor multiconductor transmission line may be considered as substantially equal in said part of said known frequency band.

The characteristic impedance matrix with respect to the return conductor, $Z_{RC}$, is frequency independent and given by $$Z_{RC} \approx \begin{pmatrix} 54.77 & 4.47 & 0.38 & 0.03 \\ 4.47 & 54.60 & 4.45 & 0.38 \\ 0.38 & 4.45 & 54.60 & 4.47 \\ 0.03 & 0.38 & 4.47 & 54.77 \end{pmatrix} \Omega \quad (22)$$

Figure 1:
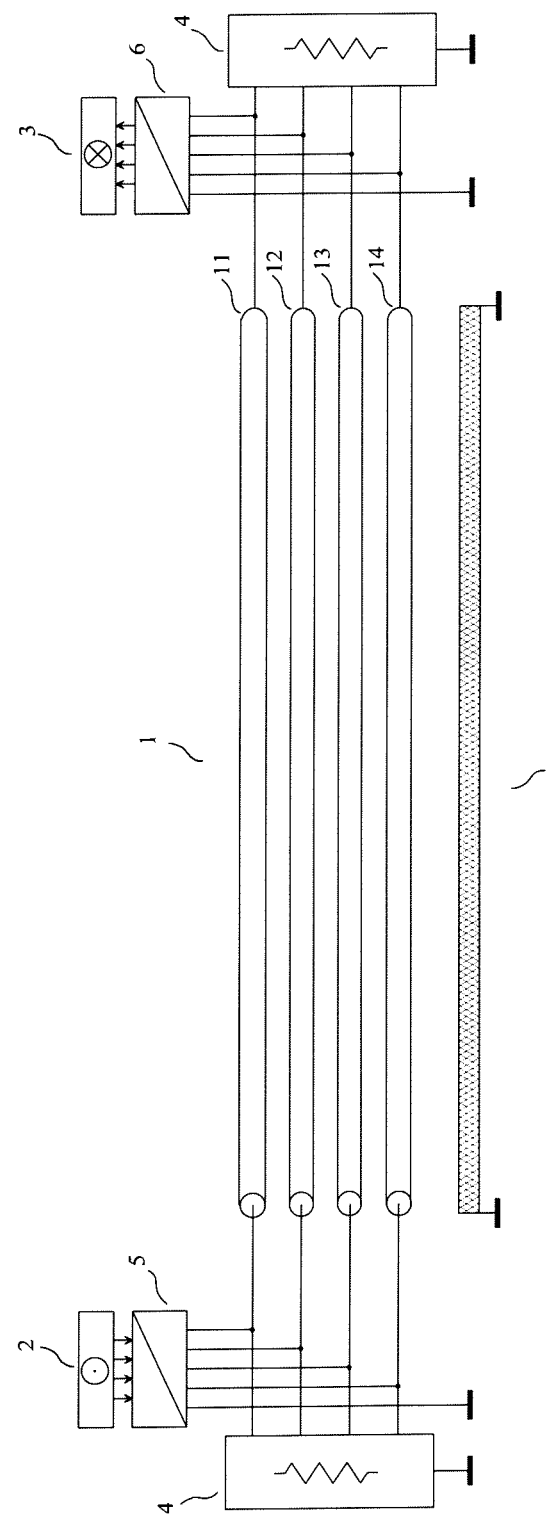
FIG. 1 shows a device for transmission comprising an interconnection having four transmission conductors, and has already been discussed in the section dedicated to the presentation of prior art.
Figure 2:
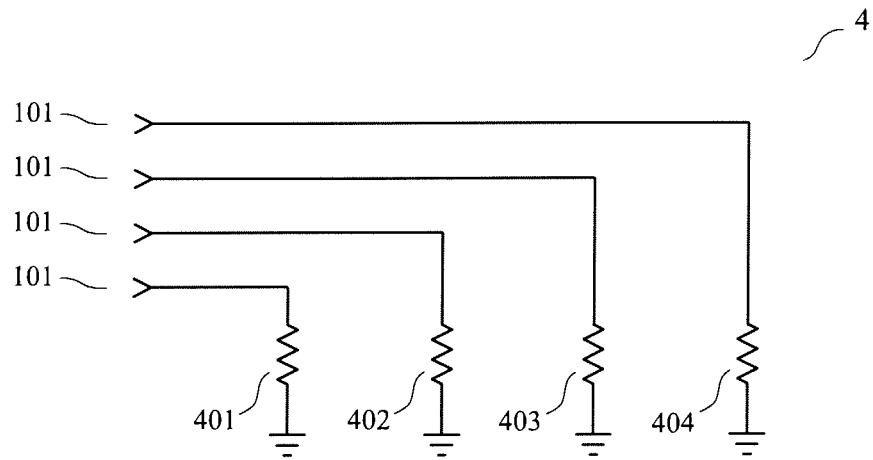
FIG. 2 shows a first termination circuit which may be used in the device for transmission shown in FIG. 1, and has already been discussed in the section dedicated to the presentation of prior art.
Figure 3:
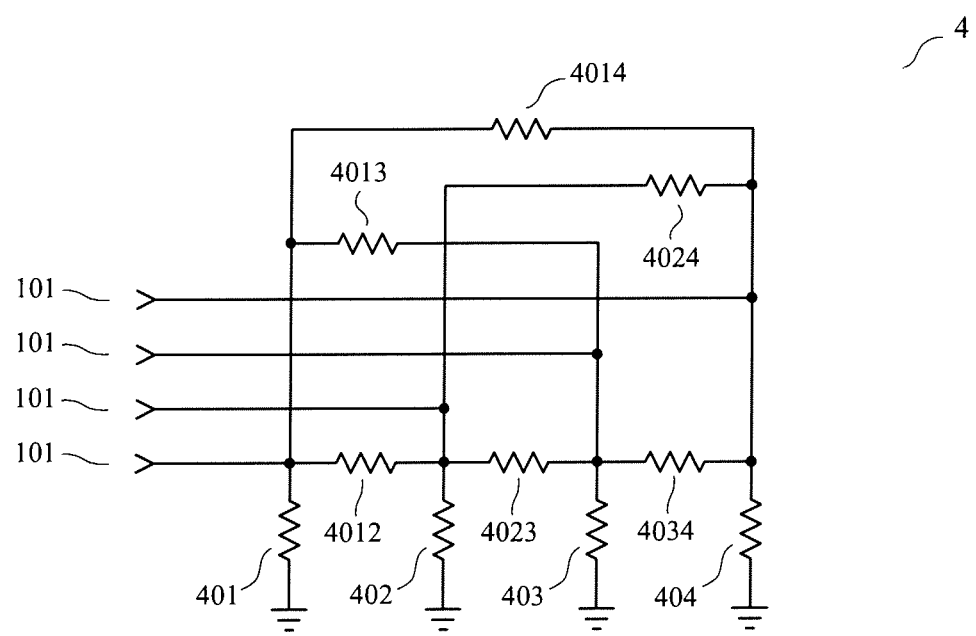
FIG. 3 shows a second termination circuit which may be used in the device for transmission shown in FIG. 1, and has already been discussed in the section dedicated to the presentation of prior art.
Figure 4:
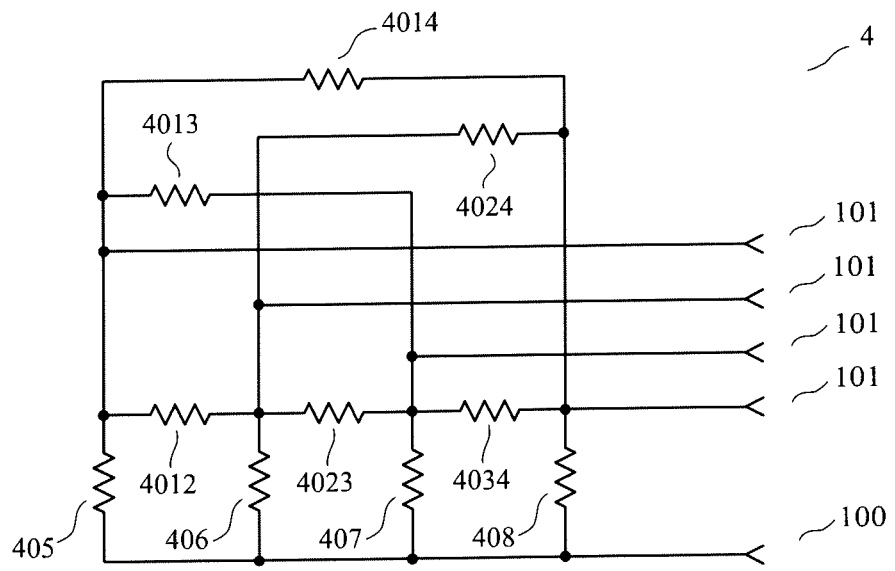
FIG. 4 shows a third termination circuit which may be used in the device for transmission shown in FIG. 1, and has already been discussed in the section dedicated to the presentation of prior art.
Figure 5:
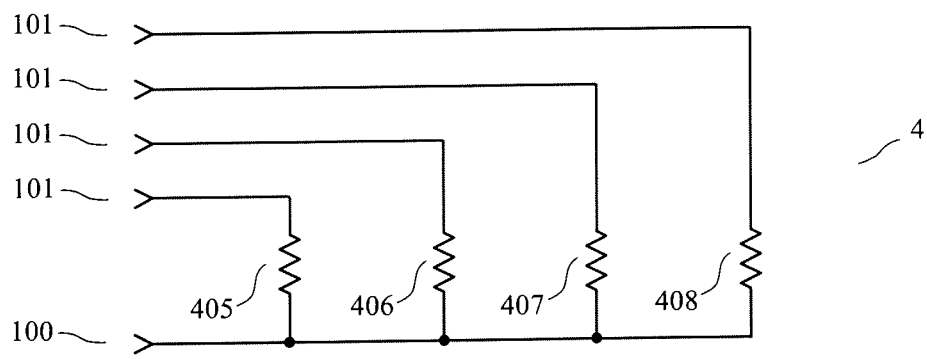
FIG. 5 shows a termination circuit which may be used in a pseudo-differential transmission scheme, and has already been discussed in the section dedicated to the presentation of prior art.

The termination circuit (4) may clearly correspond to the schematic diagram shown in FIG. 4. In this case, the termination circuit (4) comprises n signal terminals (101), a common terminal (100), n resistors (405) (406) (407) (408) each connected between the common terminal (100) and one and only one of said signal terminals (101), and n (n−1)/2 resistors (4012) (4013) (4014) (4023) (4024) (4034) each connected between two signal terminals. The signal terminals (101) of the termination circuit (4) are connected to the transmission conductors (11) (12) (13) (14) of the interconnection (1) and the common terminal (100) of the termination circuit (4) is connected to the return conductor (10) of the interconnection (1). A simple computation provides the values of the resistors such that the impedance matrix of the termination circuit with respect to the return conductor is equal to $Z_{RC}$. It is also possible to show that, in this embodiment, one may use only n−1 resistors connected between two signal terminals, these resistors (4012) (4023) (4034) corresponding to adjacent transmission conductors, and obtain an impedance matrix of the termination circuit with respect to the return conductor which closely approximates $Z_{RC}$, using only 2n−1 resistors in the termination circuit (4).

At frequencies for which the equations (11) and (12) may be used, it is possible, at any abscissa z, to define the per-unit-length impedance $Z_{RG}$ and the per-unit-length admittance $Y_{RG}$ used in the equations (11) and (12). The fact that, as explained above, there is no constraint on the manner of routing the interconnection (1) with respect to ground (7), implies that $Z_{RG}$ and $Y_{RG}$ a priori depend on the abscissa z. This implies that it is a priori not possible to model the propagation in the interconnection-ground structure using a (n+2)-conductor multiconductor transmission line, said multiconductor transmission line having uniform electrical characteristics over its length.

For the specialist, FIG. 10 shows that the position of the transmission conductors (11) (12) (13) (14) with respect to the return conductor (10) and to the reference conductor (7) is such that the return conductor (10) may in a way act as an electromagnetic screen. Consequently, the pseudo-differential device for transmission of the invention practically does not generate electromagnetic disturbances which may degrade the performances of nearby circuits, and is practically not vulnerable to electromagnetic disturbances produced by nearby circuits. Consequently, the invention practically eliminates the external crosstalk, using a principle similar to the one used in said French patent application Ser. No. 07/05260 and the corresponding international application. Additionally, the invention eliminates echo and internal crosstalk because it uses at least one termination circuit capable of absorbing incident waves and because it uses an interconnection such that the propagation constants of the different propagation modes of said (n+1)-conductor multiconductor transmission line may be considered as substantially equal in said part of said known frequency band.

An interconnection having the structure shown in FIG. 10 could also be built inside an integrated circuit, and be used in a device for implementing the method of the invention designed using an approach similar to the one presented in this first embodiment.

Second Embodiment

Best Mode

Figure 12:
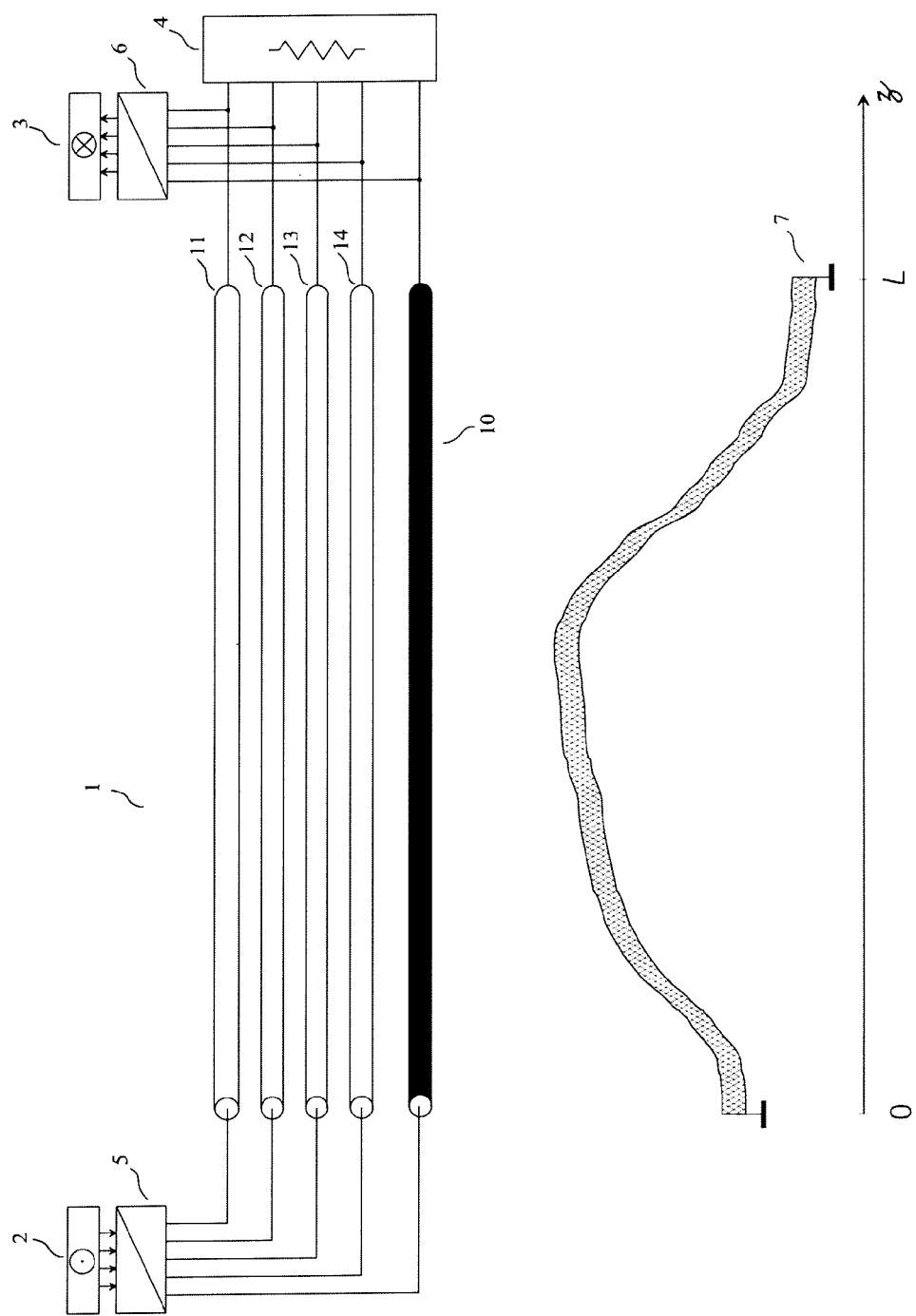
FIG. 12 shows a second embodiment of the invention.

As a second embodiment of a device for implementing the method of the invention, given by way of non-limiting example and best mode of carrying out the invention, we have represented in FIG. 12 a device of the invention comprising an interconnection (1) having n=4 transmission conductors (11) (12) (13) (14) and a return conductor (10) distinct from the reference conductor (7). A transmitting circuit (5) receives at its input the m=4 "input signals of the transmitting circuit" from them channels of the source (2), and its n+1 output terminals are connected to the conductors (10) (11) (12) (13) (14) of the interconnection (1), at the near-end of the interconnection (1). A termination circuit (4) is connected to the conductors (10) (11) (12) (13) (14) of the interconnection (1), at the far-end of the interconnection (1). A receiving circuit (6) has its n+1 input terminals connected to the conductors (10) (11) (12) (13) (14) of the interconnection (1), at the far-end of the interconnection (1). The output of the receiving circuit (6) delivers m "output signals of the receiving circuit" to the destination (3). Thus, the analog or digital signals of the m channels of the source (2) are sent to the m channels of the destination (3).

In this second embodiment, the interconnection (1) and the termination circuit (4) are identical to the ones used in the first embodiment.

The transmitting circuit (5) is a device described in the French patent application Ser. No. 08/03985 of 11 Jul. 2008, entitled "Dispositif d'interface multicanal avec circuit d'équilibrage" corresponding to the international application number PCT/IB2009/051557 of 14 Apr. 2009, entitled "Multichannel interfacing device having a balancing circuit", having n signal terminals and a common terminal, each of said signal terminals being connected to one and only one of said transmission conductors, each of said transmission conductors being connected to one and only one of said signal terminals, said common terminal being connected to said return conductor.

The transmitting circuit (5) delivers n transmission variables, each of said transmission variables being a current flowing out of a signal terminal of the transmitting circuit (5). Since the return conductor (10) is connected to said common terminal of the transmitting circuit (5), the return conductor (10) is used as a return path for the return current produced by the currents flowing in the n transmission conductors (11) (12) (13) (14). Consequently, each of said transmission variables is a natural electrical variable of said (n+1)-conductor multiconductor transmission line used to model the interconnection. Here, each of said natural electrical variables, delivered by said transmitting circuit and determined by one and only one of said "input signals of the transmitting circuit", is one of said natural voltages referenced to the return conductor, and the operation of said transmitting circuit complies with the equation (17). Consequently, each of said transmission variables delivered by said transmitting circuit (5) is a linear combination of signals each mainly determined by one of said m "input signals of the transmitting circuit".

Figure 8:
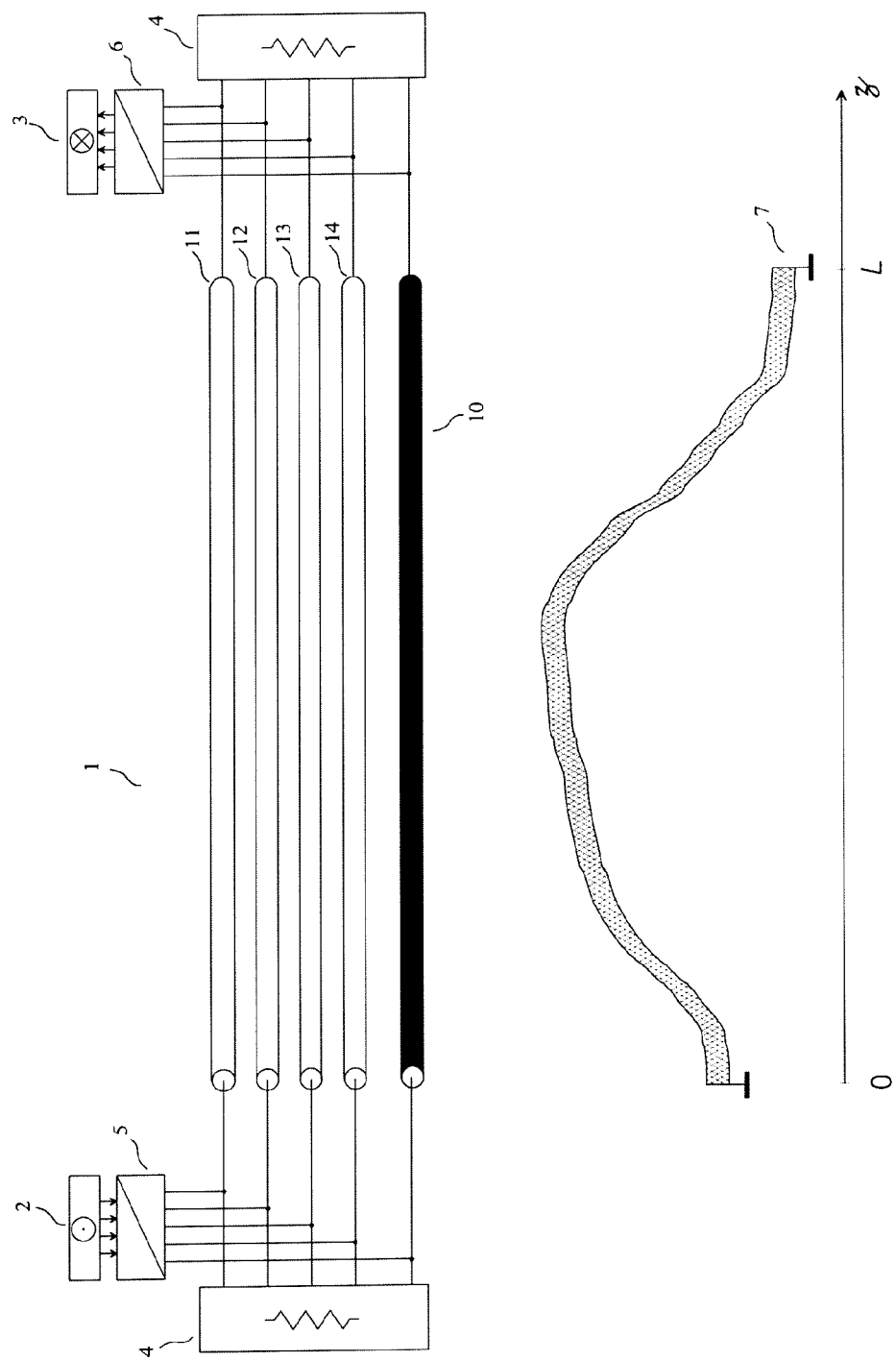
FIG. 8 shows a third prior-art pseudo-differential device for transmission comprising an interconnection having four transmission conductors (already discussed in the section dedicated to the presentation of prior art)
Figure 9:
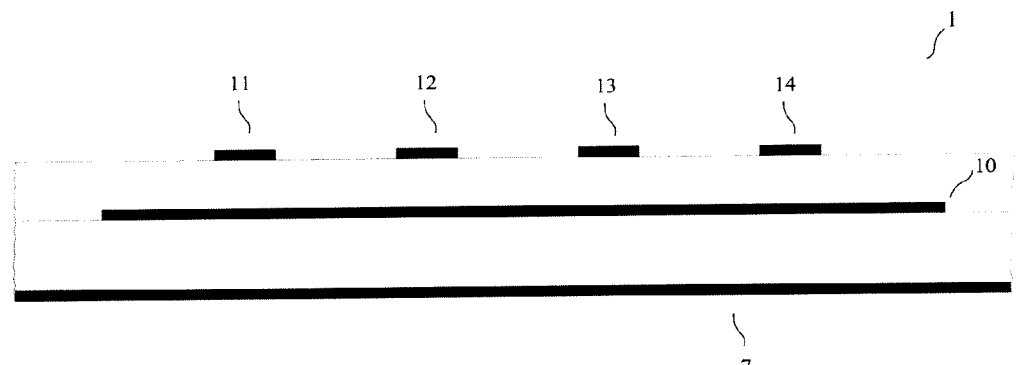
FIG. 9 shows a cross section of an interconnection and of the reference conductor, which may be used in the pseudo-differential device for transmission of the FIG. 8.

We note that this second embodiment could have used a second termination circuit, as shown in FIG. 8. However, only one termination circuit (4) is used in this second embodiment (as in the first embodiment) because waves coming from the interconnection (1) may only be incident on the far-end.

Third Embodiment

Figure 13:
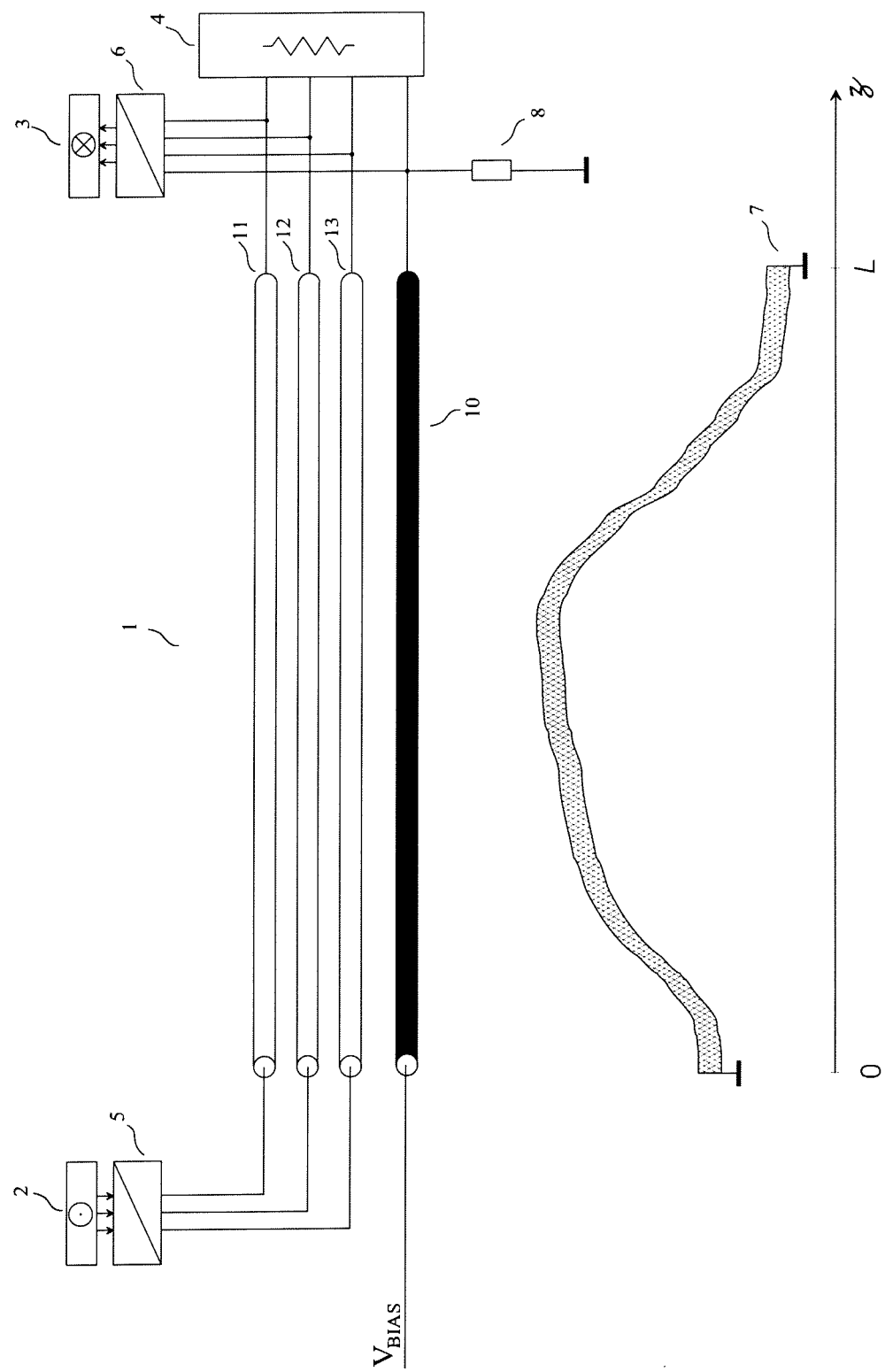
FIG. 13 shows a third embodiment of the invention.

As a third embodiment of a device for implementing the method of the invention, given by way of non-limiting example, we have represented in FIG. 13 a device of the invention comprising an interconnection (1) built on the substrate of a multi-chip module (MCM), the interconnection (1) having n=3 transmission conductors (11) (12) (13) and a return conductor (10) distinct from the reference conductor (7). A transmitting circuit (5) receives at its input the m=3 "input signals of the transmitting circuit" from the m channels of the source (2), and its n output terminals are connected to the transmission conductors (11) (12) (13) of the interconnection (1), at the near-end of the interconnection (1). A termination circuit (4) is connected to the conductors (10) (11) (12) (13) of the interconnection (1), at the far-end of the interconnection (1). A receiving circuit (6) has its n+1 input terminals connected to the conductors (10) (11) (12) (13) of the interconnection (1), at the far-end of the interconnection (1). The output of the receiving circuit (6) delivers m "output signals of the receiving circuit" to the destination (3). Thus, the analog or digital signals of the m channels of the source (2) are sent to the m channels of the destination (3).

In this third embodiment, there is only one termination circuit (4) because the signals are intended to propagate in a single direction and because a single termination sufficiently reduces reflections. The termination circuit (4) is such that, in the frequency band used for transmission, the impedance matrix, with respect to the return conductor, of said termination circuit is a non-diagonal matrix of size n×n approximately equal to the characteristic impedance matrix with respect to the return conductor of a (n+1)-conductor multiconductor transmission line used to model the interconnection, as explained above.

In this third embodiment, the return conductor (10) is, at the near-end of the interconnection (1), connected to a node presenting a fixed voltage with respect to a reference node of the transmitting circuit (5).

In this third embodiment, a damping circuit (8) is connected between the return conductor (10) and ground, at the far-end of the interconnection (1). The damping circuit (8) consists of a branch comprising a capacitor connected in series with a resistor, this branch being connected between the return conductor (10) and ground. The damping circuit (8) damps the resonances of the circuit consisting of the return conductor and of the reference conductor. The specialists understand that this may improve the protection against external crosstalk, and that, in the case where the parameters $Z_{RG}$ and $Y_{RG}$ of the equations (11) and (12) are roughly independent from the abscissa z, a good damping is obtained when the square of the impedance of the damping circuit is approximately equal to the ratio $Z_{RG}/Y_{RG}$. In practice, values ranging between 5Ω and 100Ω may often be suitable for said resistor of the damping circuit.

The transmitting circuit (5) is a device described in the French patent application number 06/00388 of 17 Jan. 2006, entitled "Amplificateur à entrées multiples et sorties multiples", corresponding to the international application number PCT/IB2006/003950 of 19 Dec. 2006 (WO 2007/083191) entitled "Multiple-input and multiple-output amplifier", having n signal output terminals, each of said signal output terminals being connected to one and only one of said transmission conductors, each of said transmission conductors being connected to one and only one of said signal output terminals.

The transmitting circuit (5) delivers n transmission variables, each of said transmission variables being a current flowing out of a signal output terminal of the transmitting circuit (5). Since the return conductor (10) is connected to said node presenting a fixed voltage with respect to a reference node of the transmitting circuit (5), said return conductor (10) is used as a return path for the return current produced by the currents flowing in the n transmission conductors (11) (12) (13). Consequently, each of said transmission variables is a natural electrical variable of said (n+1)-conductor multiconductor transmission line used to model the interconnection. Here, each of said natural electrical variables, delivered by said transmitting circuit and determined by one and only one of said "input signals of the transmitting circuit", is one of said natural voltages referenced to the return conductor, and the operation of said transmitting circuit comply with the equation (17). Consequently, each of said transmission variables delivered by said transmitting circuit (5) is a linear combination of signals each mainly determined by one of said m "input signals of the transmitting circuit".

Fourth Embodiment

Figure 14:
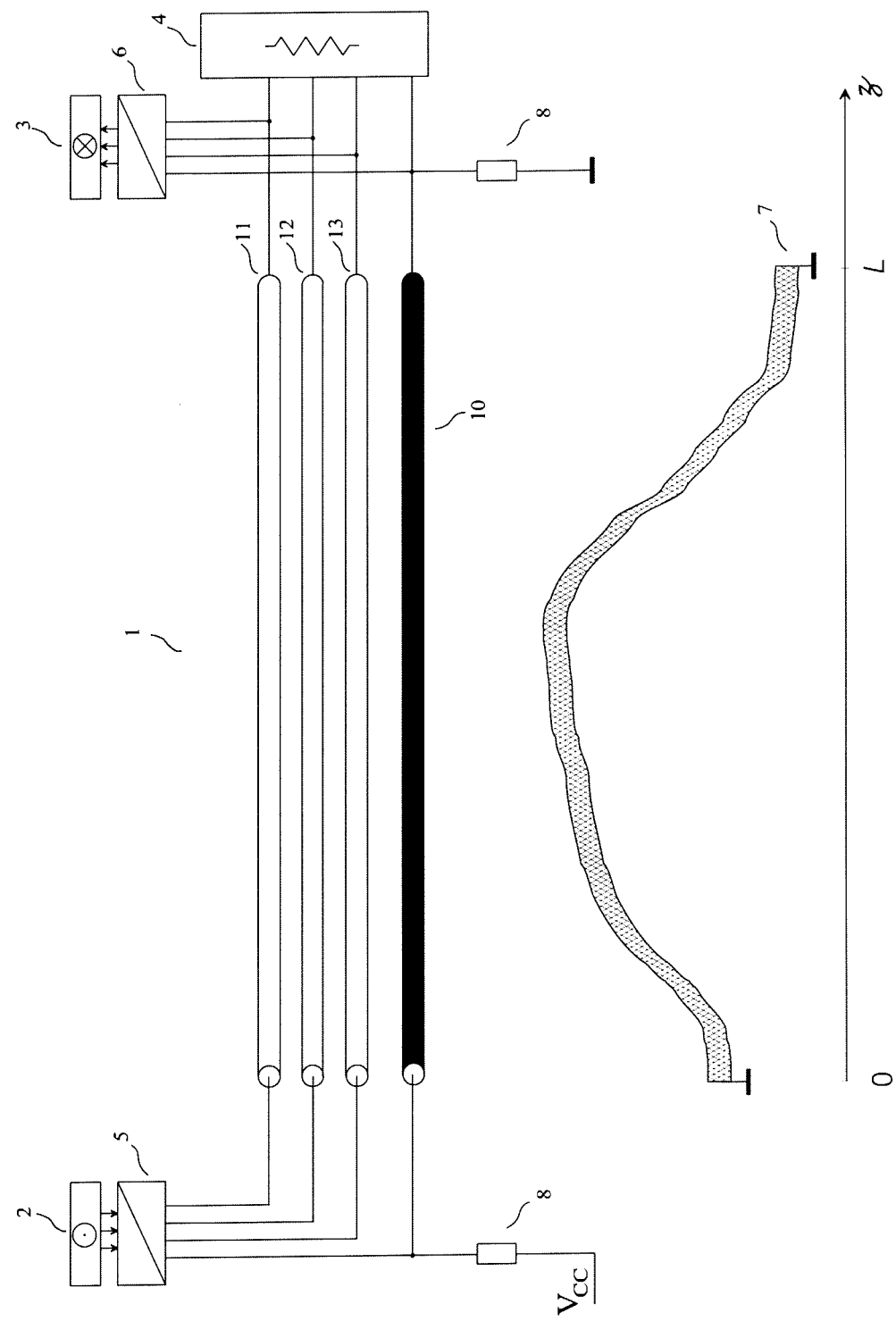
FIG. 14 shows a fourth embodiment of the invention.

As a fourth embodiment of a device for implementing the method of the invention, given by way of non-limiting example, we have represented in FIG. 14 a device of the invention comprising an interconnection (1) built on the substrate of a multi-chip module, the interconnection (1) having n=3 transmission conductors (11) (12) (13) and a return conductor (10) distinct from the reference conductor (7). A transmitting circuit (5) receives at its input the m=3 "input signals of the transmitting circuit" from the m channels of the source (2), and its n+1 output terminals are connected to the conductors (10) (11) (12) (13) of the interconnection (1), at the near-end of the interconnection (1). A termination circuit (4) is connected to the conductors (10) (11) (12) (13) of the interconnection (1), at the far-end of the interconnection (1). A receiving circuit (6) has its n+1 input terminals connected to the conductors (10) (11) (12) (13) of the interconnection (1), at the far-end of the interconnection (1). The output of the receiving circuit (6) delivers m "output signals of the receiving circuit" to the destination (3). Thus, the analog or digital signals of the m channels of the source (2) are sent to the m channels of the destination (3).

In this fourth embodiment, there is only one termination circuit (4) because the signals are intended to propagate in a single direction and because a single termination sufficiently reduces reflections.

In this fourth embodiment, two damping circuits (8) are each connected between the return conductor (10) and a node held at a constant voltage with respect to a reference terminal. For the first damping circuit, this node is a power supply terminal having a constant voltage with respect to a reference node. The second damping circuit is directly connected to a reference node. We note that it would be possible to consider that the first damping circuit is a part of the transmitting circuit (5) and/or that the second damping circuit is a part of the receiving circuit (6).

The transmitting circuit (5) is a device described in the French patent application Ser. No. 07/04889 of 6 Jul. 2007, entitled "Dispositif d'interface pseudo-différentiel avec circuit d'équilibrage", corresponding to the international application number PCT/IB2008/051942 of 16 May 2008 (WO 2009/007864), entitled "Pseudo-differential interfacing device having a balancing circuit". The transmitting circuit (5) has n signal terminals and a common terminal, each of said signal terminals being connected to one and only one of said transmission conductors, each of said transmission conductors being connected to one and only one of said signal terminals, said common terminal being connected to said return conductor.

The transmitting circuit (5) delivers n transmission variables, each of said transmission variables being a current flowing out of a signal terminal of the transmitting circuit (5). Since the return conductor (10) is connected to said common terminal of the transmitting circuit (5), said return conductor (10) is used as a return path for the return current produced by the currents flowing in the n transmission conductors (11) (12) (13). Consequently, each of said transmission variables is a natural electrical variable of said (n+1)-conductor multiconductor transmission line used to model the interconnection. Here, each of said natural electrical variables, delivered by said transmitting circuit and determined by one and only one of said "input signals of the transmitting circuit", is one of said natural currents, and the operation of said transmitting circuit complies with the equation (18). Consequently, each of said transmission variables delivered by said transmitting circuit (5) is mainly determined by one and only one of said "input signals of the transmitting circuit".

The receiving circuit (6) may be a device described in the French patent application Ser. No. 08/03830 of 7 Jul. 2008, entitled "Circuit de réception pseudo-différentiel", and in the corresponding international application number PCT/IB2009/051053 of 13 Mar. 2009, entitled "Pseudo-differential receiving circuit", having n signal terminals and a common terminal, each of said signal terminals being connected to one and only one of said transmission conductors, each of said transmission conductors being connected to one and only one of said signal terminals, said common terminal being connected to said return conductor. The receiving circuit (6) may also be a device described in the French patent application Ser. No. 08/03982 of 11 Jul. 2008 entitled "Amplificateur a entrées multiples et sorties multiples ayant des entrées pseudo-différentielles" and in the corresponding international application number PCT/IB2009/051358 of 31 Mar. 2009, entitled "Multiple-input and multiple-output amplifier having pseudo-differential inputs", having n signal input terminals and a common terminal, each of said signal input terminals being connected to one and only one of said transmission conductors, each of said transmission conductors being connected to one and only one of said signal input terminals, said common terminal being connected to said return conductor.

The receiving circuit (6) senses the natural voltages referenced to the return conductor of the column-vector $V_{RX}$ and each of said "output signals of the receiving circuit" is mainly determined by a component of the product $Z_{RC}^{-1} V_{RX}$. Thus, the receiving circuit (6) delivers m "output signals of the receiving circuit", each of said "output signals of the receiving circuit" being mainly determined by a linear combination of said natural voltages referenced to the return conductor, one or more of said linear combinations being such that two or more of the coefficients of said one or more of said linear combinations are not equal to zero.

Figure 6:
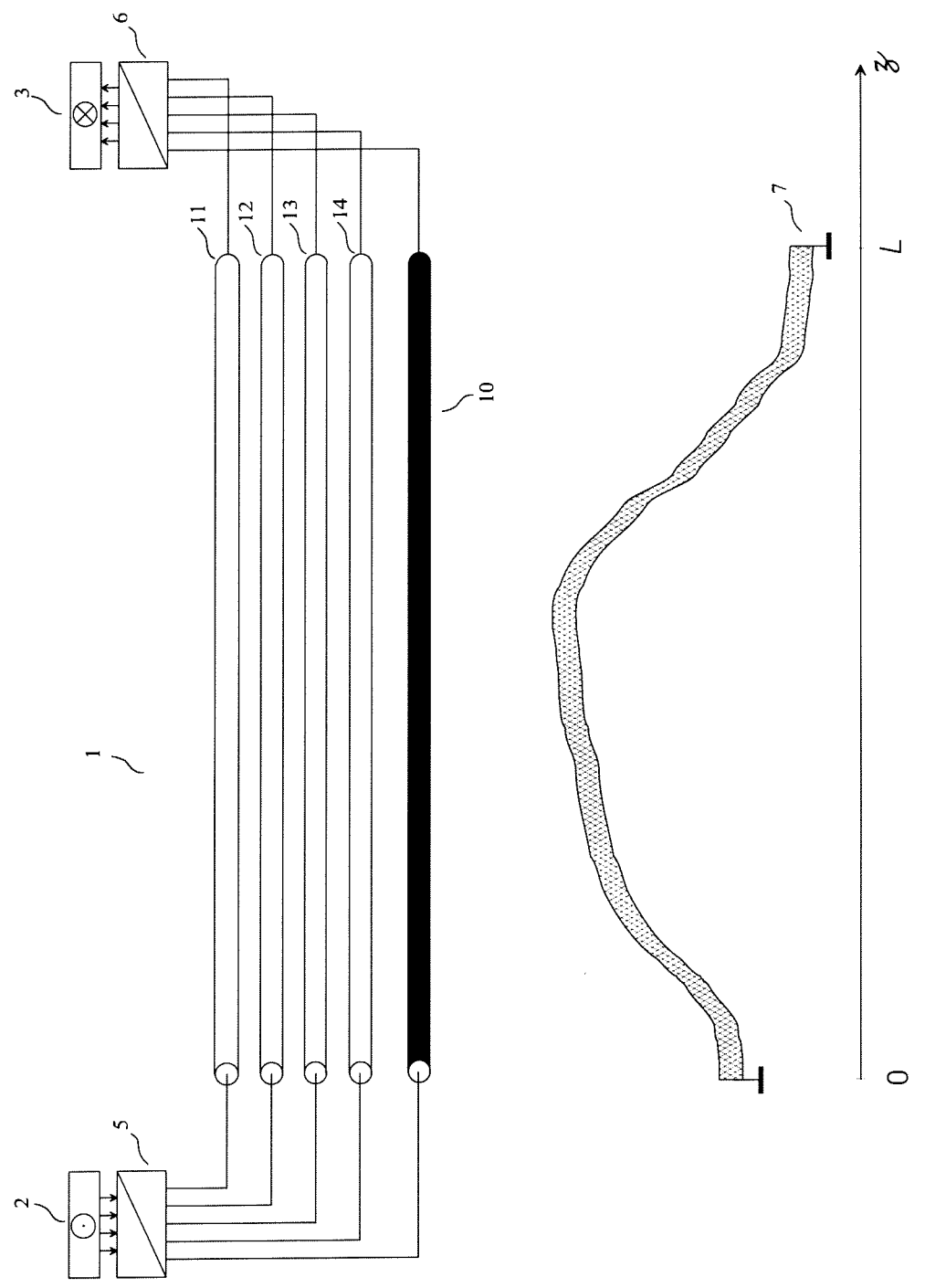
FIG. 6 shows a first prior-art pseudo-differential device for transmission comprising an interconnection having four transmission conductors (already discussed in the section dedicated to the presentation of prior art)
Figure 7:
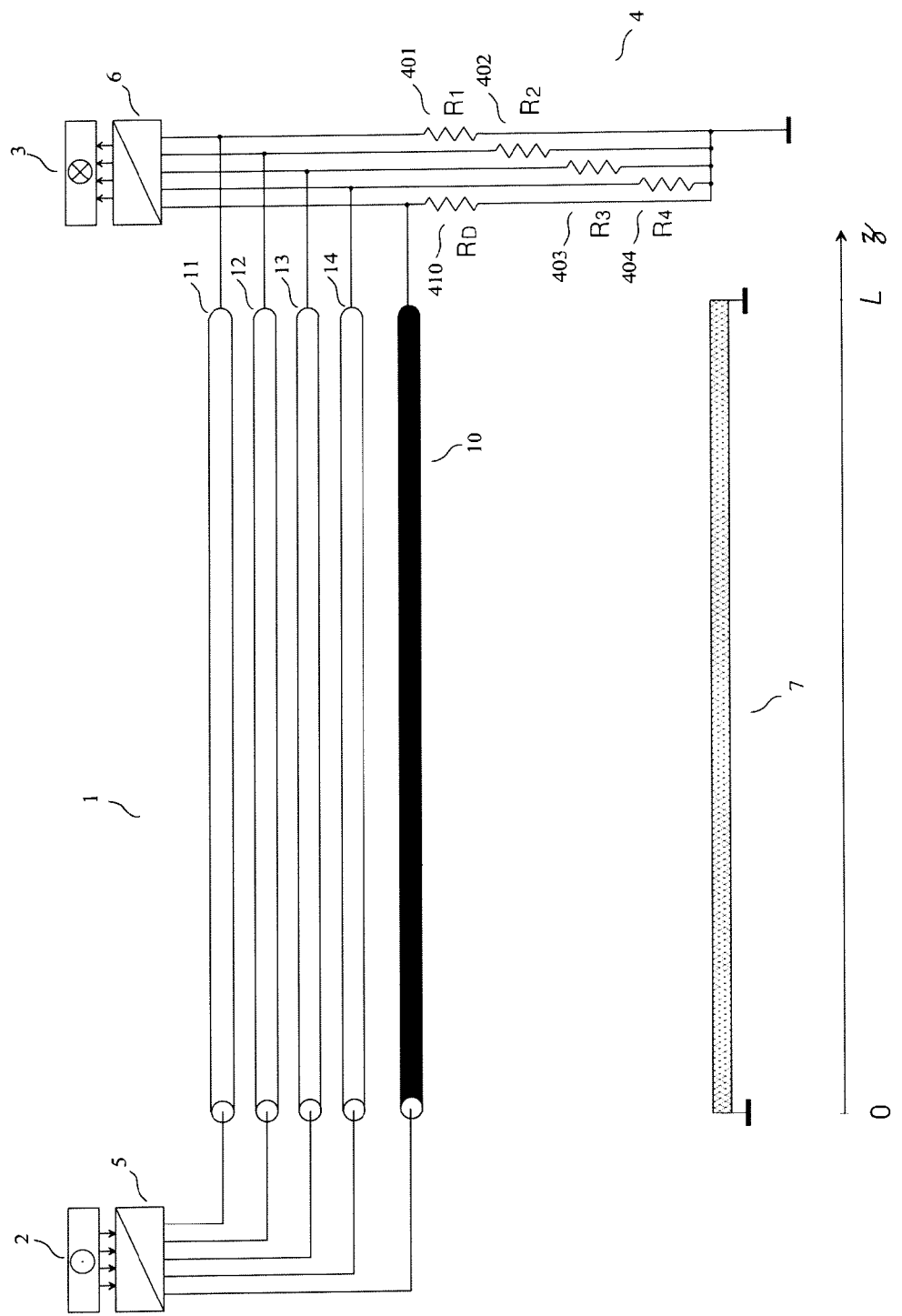
FIG. 7 shows a second prior-art pseudo-differential device for transmission comprising an interconnection having four transmission conductors (already discussed in the section dedicated to the presentation of prior art)

In this fourth embodiment, the receiving circuit (6) may for instance be similar to the receiving circuit shown in FIG. 6 of said French patent application Ser. No. 08/03830 and the corresponding international application. Such a receiving circuit uses an alternating current coupling to the conductors (10) (11) (12) (13) of the interconnection (1).

Fifth Embodiment

Figure 15:
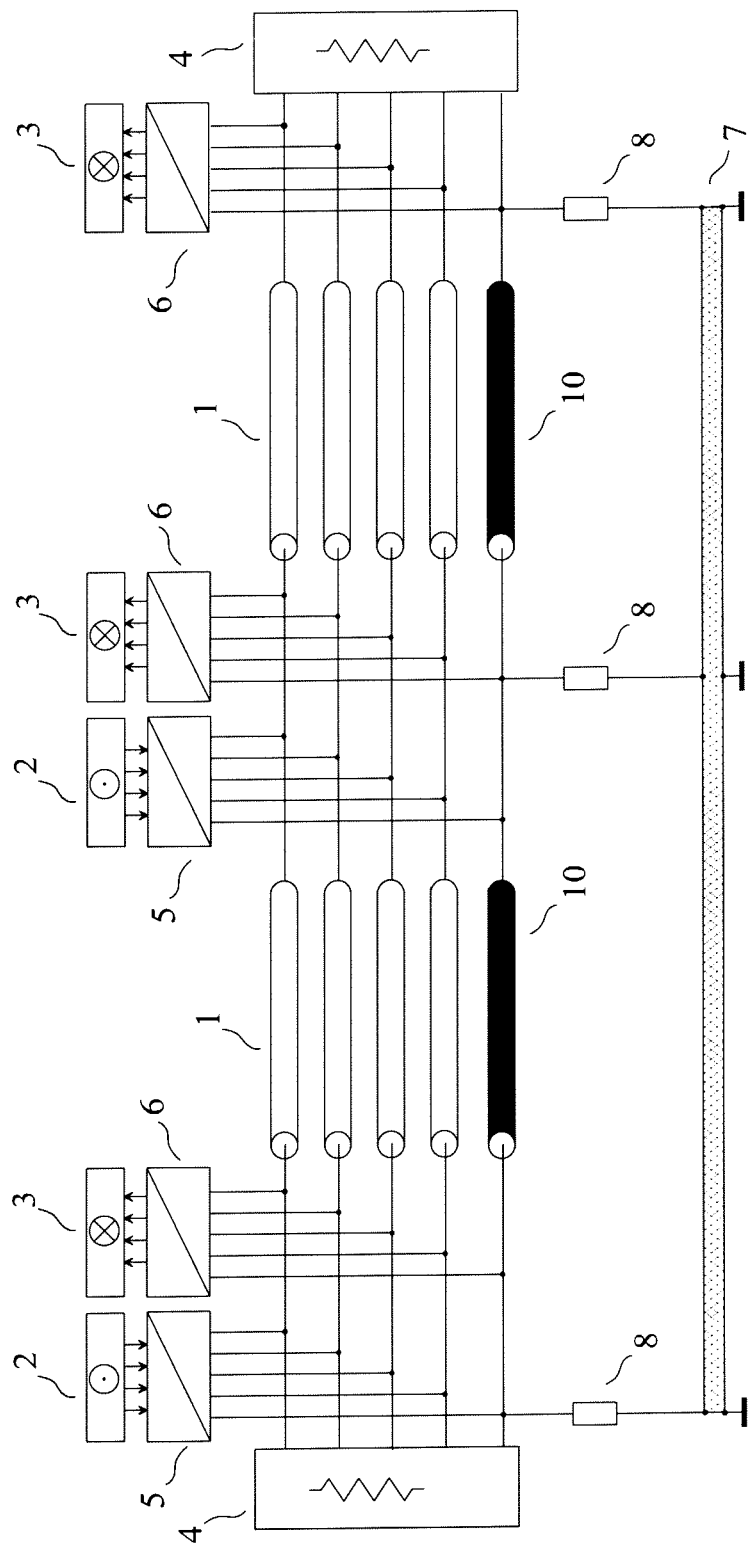
FIG. 15 shows a fifth embodiment of the invention.

As a fifth embodiment of a device for implementing the method of the invention, given by way of non-limiting example, we have represented in FIG. 15 a device of the invention comprising an interconnection (1) having n=4 transmission conductors and a return conductor (10) distinct from the reference conductor (7). At each end of the interconnection (1), a termination circuit (4) is connected to the conductors of the interconnection (1). Each termination circuit (4) is such that the impedance matrix of the termination circuit with respect to the return conductor is, in a part of the frequency band used for transmission, a non-diagonal matrix of size n×n approximately equal to the characteristic impedance matrix with respect to the return conductor of a (n+1)-conductor multiconductor transmission line used to model the interconnection, as explained above. Two transmitting circuits (5) placed at two different abscissa z, receive at their inputs the signals from the m=4 channels of the two sources (2), and the n+1 output terminals of each transmitting circuit are connected to the n+1 conductors of the interconnection (1). Three receiving circuits (6) are placed at three different abscissa z and the n+1 input terminals of each receiving circuit are connected to the n+1 conductors of the interconnection (1). Three damping circuits (8) are connected between the return conductor (10) and the reference conductor (7). The output of each receiving circuit (6) delivers m "output signals of the receiving circuit" to a destination (3).

In this fifth embodiment, the geometry of the interconnection (1) and of the reference conductor (7) is such that the section of the interconnection (1) and of the reference conductor (7), in a plane orthogonal to the direction of propagation, practically does not change over the greatest part of the length of the interconnection, in the vicinity of the transmission conductors.

In FIG. 15, each of the transmitting circuits (5) is associated with a receiving circuit (6) placed at the same abscissa z as said each of the transmitting circuit (5). Each of said transmitting circuits (5) is a device described in said French patent application Ser. No. 08/03985 and the corresponding international application, having n signal terminals and a common terminal.

Each of said transmitting circuits (5) delivers, when said each of said transmitting circuits (5) is in the activated state, n transmission variables, each of said transmission variables being a current flowing out of a signal terminal of said each of said transmitting circuits (5). Since the return conductor (10) is connected to said common terminal of each of said transmitting circuits (5), said return conductor (10) is used as a return path for the return current produced by the currents flowing in the n transmission conductors (11) (12) (13) (14). Consequently, each of said transmission variables is a natural electrical variable of said (n+1)-conductor multiconductor transmission line used to model the interconnection. Here, each of said natural electrical variables, delivered by one of said transmitting circuits and determined by one and only one of said "input signals of the transmitting circuit", is one of said natural voltages referenced to the return conductor, and the operation of each of said transmitting circuit complies with the equation (17). Consequently, each of said transmission variables delivered by one of said transmitting circuits (5) in the activated state is a linear combination of signals each mainly determined by the signal of a single channel of the source (2) connected to said one of said transmitting circuits (5). However, each of said transmitting circuit (5) in the activated state produces natural electrical variables, each of said natural electrical variables being allocated to one and only one channel.

We note that FIG. 15 shows a data bus architecture, and that the address and/or control lines needed to obtain the activated state of at most one transmitting circuit (5) at a given point in time are not shown in FIG. 15.

Each of the m "output signals of the receiving circuit" delivered by any one of the receiving circuits (6) is mainly determined by one and only one of the natural voltages referenced to the return conductor appearing at the input of said any one of the receiving circuits (6). Thus, the signals of the m channels of a source (2) connected to a transmitting circuit (5) in the activated state are sent to the m channels of the destinations (3), without noticeable echo, internal crosstalk or external crosstalk.

We note that, in the device of FIG. 15, the transmitting circuits (5) and the receiving circuits (6) being connected in parallel with the interconnection (1), they may, in order not to disturb the propagation of waves along the interconnection in a detrimental way, and in order not to produce undesirable reflections at the ends of the interconnection, present high impedances to the interconnection. In the device of FIG. 15, two termination circuits (4) are necessary because waves coming from the interconnection (1) may be incident on both ends.

This fifth embodiment is intended for transmitting digital signals. In FIG. 15, the bus architecture uses a direct connection of the transmitting circuits (5) and of the receiving circuits (6) to the interconnection (1). This is not a characteristic of the invention. For instance, according to the invention, one or more of the transmitting circuits (5) and/or one or more of the receiving circuits (6) may be coupled to the interconnection (1) using one or more electromagnetic couplers. This type of coupling is for instance described in the patent of the U.S. Pat. No. 7,080,186 entitled "Electromagnetically-coupled bus system". This type of indirect coupling may provide a higher transmission bandwidth.

INDICATIONS ON INDUSTRIAL APPLICATIONS

The invention is suitable for pseudo-differential transmission between integrated circuits through an interconnection having two or more transmission conductors, the transmission presenting reduced echo, reduced internal crosstalk and reduced external crosstalk. A very important point is that, since the return conductor in a way acts as an electromagnetic screen, a specialist in electromagnetic compatibility understands that the invention may provide a reduced emission of radiated disturbances and an increased immunity to radiated disturbances.

The invention is suitable for the protection against the noise produced by unwanted electromagnetic couplings in printed circuit boards. The invention is particularly advantageous to printed circuit boards comprising wide-band analog circuits or fast digital circuits. For transmitting in m transmission channels, the invention has the advantage of only requiring m+1 pins on an integrated circuit providing the functions of a transmitting circuit and of a receiving circuit, as opposed to 2m pins in the case of a transceiver for differential transmission.

The invention is suitable for the protection against the noise produced by unwanted electromagnetic couplings in flexible printed circuit boards, for instance the flexible printed circuit boards used as a link between a magnetic head of a hard disk drive and a rigid printed circuit board, or the flexible printed circuit boards used as a link between a flat panel display and a rigid printed circuit board.

The invention is particularly suitable for pseudo-differential transmission inside an integrated circuit, because it provides a good protection against the noise related to the currents flowing in the reference conductor and in the substrate of the integrated circuit.

The invention is suitable for an implementation in a data bus architecture.

The invention is particularly suitable for multilevel signaling, because this type of transmission scheme is more sensitive to noise than binary signaling.

The invention is particularly suitable for simultaneous bi-directional signaling, because this type of transmission scheme is more sensitive to noise than unidirectional signaling.

The invention claimed is:

1. A method for transmitting through an interconnection having n transmission conductors and a return conductor distinct from a reference conductor, n being an integer greater than or equal to 2, the method providing, in a known frequency band, m transmission channels each corresponding to a signal to be sent from the input of at least one transmitting circuit to the output of at least one receiving circuit, where m is an integer greater than or equal to 2 and less than or equal to n, the method comprising the steps of:

numbering the transmission conductors from 1 to n and defining, for any integer j greater than or equal to 1 and less than or equal to n, at any given abscissa along the interconnection, a natural current of index j as the current flowing in the transmission conductor number j, and a natural voltage referenced to the return conductor of index j as the voltage between the transmission conductor number j and the return conductor;

modeling the interconnection, in a part of the known frequency band, taking into account the lumped impedances seen by the interconnection and caused by the circuits connected to the interconnection elsewhere than at the ends of the interconnection, as a (n+1)-conductor multiconductor transmission line, the multiconductor transmission line having uniform electrical characteristics over its length, the multiconductor transmission line using the natural voltages referenced to the return conductor and the natural currents as natural electrical variables, the electrical characteristics being such that the propagation constants of the different propagation modes of the multiconductor transmission line are considered as substantially equal in said part of the known frequency band;

using one said transmitting circuit receiving m input signals of the transmitting circuit corresponding each to a transmission channel, the output of said transmitting circuit being coupled to at least m of the transmission conductors, the output of said transmitting circuit delivering natural electrical variables, each of the natural electrical variables being mainly determined by one and only one of the input signals of the transmitting circuit;

using one said receiving circuit delivering m output signals of the receiving circuit corresponding each to a transmission channel, the input of said receiving circuit being coupled to at least m of the transmission conductors and to the return conductor, each of the output signals of the receiving circuit being mainly determined by the natural voltages referenced to the return conductor;

determining, for the multiconductor transmission line and said part of the known frequency band, a characteristic impedance matrix with respect to the return conductor; and coupling the terminals of at least one termination circuit to the return conductor and to each of the transmission conductors, said at least one termination circuit being, in said part of the known frequency band, approximately characterized, for the interconnection, by an impedance matrix with respect to the return conductor, the impedance matrix with respect to the return conductor being a non-diagonal matrix of size n×n approximately equal to the characteristic impedance matrix with respect to the return conductor.

2. The method of claim 1, wherein, in said part of the known frequency band, each component of the matrix of the voltage reflection coefficients, with respect to the return conductor, of at least one said termination circuit, has an absolute value less than or equal to 5/100.

3. A device for proportioning a device for transmitting through an interconnection having n transmission conductors and a return conductor distinct from a reference conductor, n being an integer greater than or equal to 2, the device for transmitting through an interconnection providing, in a known frequency band, m transmission channels, where m is an integer greater than or equal to 2 and less than or equal to n, the device for proportioning a device for transmitting through an interconnection comprising means for modeling the interconnection, in a part of the known frequency band, taking into account the lumped impedances seen by the interconnection and caused by the circuits connected to the interconnection elsewhere than at the ends of the interconnection, as a (n+1)-conductor multiconductor transmission line, the multiconductor transmission line having uniform electrical characteristics over its length, the multiconductor transmission line using natural voltages referenced to the return conductor and natural currents as natural electrical variables, the electrical characteristics being such that the propagation constants of the different propagation modes of the multiconductor transmission line are considered as substantially equal in said part of the known frequency band.

4. The device of claim 3, further comprising:
means for determining, for the multiconductor transmission line and said part of the known frequency band, a characteristic impedance matrix with respect to the return conductor; and means for proportioning a termination circuit, the termination circuit being, in said part of the known frequency band, approximately characterized, for the interconnection, by an impedance matrix with respect to the return conductor, the impedance matrix with respect to the return conductor being a non-diagonal matrix of size n×n approximately equal to the characteristic impedance matrix with respect to the return conductor.

5. The device of claim 3, further comprising:
means for proportioning a transmitting circuit, the transmitting circuit receiving m input signals of the transmitting circuit, the output of the transmitting circuit being coupled to at least m of the transmission conductors, the output of the transmitting circuit delivering natural electrical variables, each of the natural electrical variables being mainly determined by one and only one of the input signals of the transmitting circuit; and means for proportioning a receiving circuit, the receiving circuit delivering m output signals of the receiving circuit, the input of the receiving circuit being coupled to at least m of the transmission conductors and to the return conductor, each of the output signals of the receiving circuit being mainly determined by the natural voltages referenced to the return conductor.

6. The device of claim 3, wherein the means for modeling the interconnection comprise means for measuring and/or for computing the real electrical characteristics of the interconnection, based on the relative layout of the transmission conductors and of the return conductor and on the characteristics of the dielectrics surrounding the transmission conductors and the return conductor.

7. A device for transmission providing, in a known frequency band, m transmission channels each corresponding to a signal to be sent from the input of at least one transmitting circuit to the output of at least one receiving circuit, where m is an integer greater than or equal to 2, comprising:
an interconnection having n transmission conductors and a return conductor distinct from a reference conductor, n being an integer greater than or equal to m, the interconnection being structurally combined with the reference conductor throughout the length of the interconnection, the interconnection being such that the interconnection can be modeled, in a part of the known frequency band, taking into account the lumped impedances seen by the interconnection and caused by the circuits connected to the interconnection elsewhere than at the ends of the interconnection, as a (n+1)-conductor multiconductor transmission line, the multiconductor transmission line having uniform electrical characteristics over its length, the multiconductor transmission line using natural voltages referenced to the return conductor and natural currents as natural electrical variables, the electrical characteristics being such that the propagation constants of the different propagation modes of the multiconductor transmission line are considered as substantially equal in said part of the known frequency band;

at least one said transmitting circuit receiving m input signals of the transmitting circuit corresponding each to a transmission channel, the output of said at least one said transmitting circuit being coupled to at least m of the transmission conductors, the output of said at least one said transmitting circuit delivering natural electrical variables when said at least one said transmitting circuit is in the activated state, each of the natural electrical variables being mainly determined by one and only one of the input signals of the transmitting circuit;

at least one said receiving circuit delivering, when said at least one said receiving circuit is in the activated state, m output signals of the receiving circuit corresponding each to a transmission channel, the input of said at least one said receiving circuit being coupled to at least m of the transmission conductors and to the return conductor, each of said output signals of the receiving circuit being mainly determined by the natural voltages referenced to the return conductor; and at least one termination circuit coupled to the return conductor and to each of the transmission conductors, said at least one termination circuit being, when said at least one termination circuit is in the activated state, approximately characterized, for the interconnection, at at least one quiescent operating point, for small signals in said part of the known frequency band, by an impedance matrix with respect to the return conductor, the impedance matrix with respect to the return conductor being a non-diagonal matrix of size n×n approximately equal to a characteristic impedance matrix with respect to the return conductor of the (n+1)-conductor multiconductor transmission line.

8. The device of claim 7, wherein the number m of transmission channels between one of the transmitting circuits and one of the receiving circuits is equal to the number n of transmission conductors.

9. The device of claim 7, wherein each of the termination circuits is arranged at an end of the interconnection.

10. The device of claim 7, wherein at least one said termination circuit is made of a network of resistors, n of the resistors being each connected between one of the transmission conductors and the return conductor, one or more of the resistors being each connected between two of the transmission conductors.

11. The device of claim 7, wherein the impedance matrix with respect to the return conductor, of at least one said termination circuit in the activated state, can be adjusted by electrical means.

12. The device of claim 7, wherein at least one said termination circuit has an activated state and a deactivated state, each current flowing from said at least one said termination circuit to one of the transmission conductors being substantially zero when said at least one said termination circuit is in the deactivated state.

13. The device of claim 7, further comprising one or more damping circuits coupled to the return conductor, each of the damping circuits being, for the return conductor, approximately equivalent to a network consisting of a passive two-terminal circuit element connected in series with a voltage source delivering a constant voltage, the network having a first terminal coupled to the return conductor, the network having a second terminal coupled to the reference conductor.

* * * * *